United States Patent [19]
Kubota

[11] Patent Number: 5,558,414
[45] Date of Patent: Sep. 24, 1996

[54] VEHICLE BRAKING SYSTEM CAPABLE OF CONTROLLING PUMP FOR OPTIMUM RATE OF CHANGE OF BRAKE CYLINDER PRESSURE

[75] Inventor: Kazuhiko Kubota, Toyota, Japan

[73] Assignee: Toyota Jidosha Kabushiki Kaisha, Toyota, Japan

[21] Appl. No.: 556,791

[22] Filed: Nov. 2, 1995

[30] Foreign Application Priority Data

Nov. 24, 1994 [JP] Japan ................................ 6-289729

[51] Int. Cl.⁶ .................................................. B60T 8/32
[52] U.S. Cl. .................. 303/122.08; 303/10; 303/116.1; 303/122.12; 303/113.5; 303/61
[58] Field of Search ........................ 303/122.12, 122.08, 303/DIG. 3, DIG. 4, 10, 149, 11, 150, 12, 61, 116.1, 116.4, 116.3, 113.5, 20, 122.03, 122.05, 122.06, 122.07, 156, 157; 188/181 A, 151 A; 364/426.01, 426.02, 426.03

[56] References Cited

U.S. PATENT DOCUMENTS

| | | | |
|---|---|---|---|
| 4,484,784 | 11/1984 | Leiber | 303/122.08 |
| 4,560,210 | 12/1985 | Tani et al. | |
| 4,687,260 | 8/1987 | Matsui et al. | 303/116.1 |
| 4,832,418 | 5/1989 | Mattusch | 303/122.08 |
| 5,197,787 | 3/1993 | Matsuda et al. | 303/116.4 |
| 5,487,593 | 1/1996 | Potts et al. | 303/11 |
| 5,494,343 | 2/1996 | Lindenman et al. | 303/122.12 |

FOREIGN PATENT DOCUMENTS 63-31870A  2/1988  Japan .

Primary Examiner—Douglas C. Butler
Attorney, Agent, or Firm—Kenyon & Kenyon

[57] ABSTRACT

A vehicle braking system including, a pump operated by a pump actuator driven by a DC power source, an electrically operated pressure control device having operating states which are selectively established to electrically control the fluid pressure in wheel brake cylinder and which includes a pressure-increase state for fluid communication of the wheel brake cylinder with at least one of a master cylinder and pump and a pressure-decrease state for fluid communication of the wheel brake cylinder with a reservoir, and a pump actuator control device having a power supply portion for intermittently supplying electric power from the DC power source to the pump actuator such that the duty ratio of the pump actuator is controlled in response to a duty ratio signal, and a signal generating portion for generating the duty ratio signal. The signal generating portion includes a device for optimizing a rate of change of the wheel brake cylinder pressure depending upon at least one of an output of the DC power source and a currently selected operating state of the pressure control device.

17 Claims, 13 Drawing Sheets

5,558,414

VEHICLE BRAKING SYSTEM CAPABLE OF CONTROLLING PUMP FOR OPTIMUM RATE OF CHANGE OF BRAKE CYLINDER PRESSURE

BACKGROUND OF THE INVENTION

1. Field of the Invention

The present invention relates in general to a braking system for a motor vehicle, and more particularly to improvements in technology for optimizing an operation of a pump used in the braking system.

2. Discussion of the Related Art

There is known a braking system wherein the pressure in a brake cylinder is electrically controllable. One kind of such a braking system includes (a) an operator-controlled brake operating member, (b) a master cylinder for generating a fluid pressure according to an amount of operation of the brake operating member, (c) a wheel brake cylinder for operating a wheel brake to brake a wheel of a motor vehicle according to a fluid pressure applied to the wheel brake cylinder, (d) a reservoir for storing a working fluid, (e) a pump for pressurizing the fluid sucked up from the reservoir, and delivering the pressurized fluid toward at least one of the master cylinder and the wheel brake cylinder, (f) a DC power source, (g) a pump actuator driven by the DC power source to operate the pump, and (h) a solenoid-operated pressure control device having a plurality of operating states which are selectively established to electrically control the fluid pressure in the wheel brake cylinder and which include a pressure-increase state for substantial fluid communication of the wheel brake cylinder with at least one of the master cylinder and the pump, and a pressure-decrease state for substantial fluid communication of the wheel brake cylinder with the reservoir.

In one type of the braking system as described above, the solenoid-operated pressure control device is adapted to increase the fluid pressure in the wheel brake cylinder by permitting a flow of the working fluid from the master cylinder as a pressure source toward the wheel brake cylinder. In another type of the braking system, the solenoid-operated pressure control device is adapted to increase the fluid pressure in the wheel brake cylinder by inhibiting a flow of the working fluid from the master cylinder toward the wheel brake cylinder while permitting a flow of the working fluid from the pump as a pressure source toward the wheel brake cylinder. In the former type, the pump is used to return the fluid to the master cylinder from the reservoir which receives the fluid discharged from the wheel brake cylinder when the fluid pressure in the wheel brake cylinder is reduced. In the latter type, the pump is used to return the fluid from the reservoir to the wheel brake cylinder to increase the fluid pressure in the wheel brake cylinder. The former and latter types of braking system will be referred to as "fluid recirculating type" and "pressure-increase-by-pump type", respectively An example of a known braking system of the pressure-increase-by-pump type is disclosed in Japanese publication JP-A-63-31870, which includes a reciprocating type solenoid-operated pump actuator, and a pump actuator control device having (i) a power supply portion for intermittently supplying electric power from a DC power source to a solenoid of the solenoid-operated pump actuator such that a duty ratio of the solenoid is controlled in response to a duty ratio signal, and (ii) a signal generating portion for generating the duty ratio signal. The signal generating portion includes a signal determining means for determining the duty ratio signal depending upon a friction coefficient of a road surface (on which the vehicle is running) when the fluid pressure in the wheel brake cylinder is controlled by the solenoid-operated pressure control device. In the braking system disclosed in the above-identified publication, therefore, the amount of delivery of the pressurized fluid from the pump is changed depending upon the friction coefficient of the road surface.

The inventors of the present application has developed a braking system of the pressure-increase-by pump type wherein the solenoid-operated pressure control device has a plurality of operating states which are selectively established to control the fluid pressure in the wheel brake cylinder and which include a pressure-decrease state in which the wheel brake cylinder communicates with not only the reservoir but also the pump. This braking system will be described in detail in the PREFERRED EMBODIMENT OF THE INVENTION.

The braking systems of the recirculating type as well as the pressure-increase-by-pump type may be provided with a diagnostic device for diagnosing the pump actuator for any abnormalities such as electrical disconnection or discontinuity of the pump actuator and associated components, and a failure of the pump actuator to normally operate or function. The pump actuator may be a rotary actuator in the form of an electric motor. In this case, the diagnostic device is adapted to supply electric power from the DC power source to the motor to hold the motor on for a predetermined time, and diagnose the motor and the associated components for abnormalities.

In the conventional braking systems described above, however, the operation of the pump is not sufficiently optimized during operation of the solenoid-operated pressure control device or diagnostic device, as described below in detail.

The braking system of the pressure-increase-by-pump type disclosed in the Japanese publication identified above is designed to change the delivery amount of the pump depending upon the friction coefficient of a road surface on which the vehicle is running. Therefore, the rate of increase of the fluid pressure in the wheel brake cylinder can be optimized depending upon the friction coefficient, namely, depending upon the fluid pressure in the wheel brake cylinder. However, the rate of increase of the fluid pressure in the wheel brake cylinder is changed by other factors. For example, the operation of the pump and the rate of increase of the wheel brake cylinder pressure are influenced by a variation in the output state (e.g., voltage) of the DC power source. Thus, the braking system disclosed in the publication suffers from a problem that a variation in the output state of the DC power source prevents an optimum rate of increase of the fluid pressure in the wheel brake cylinder.

In the braking system developed by the present inventor wherein the solenoid-operated pressure control device has a plurality of selectively established operating states including the pressure-decrease position in which the wheel brake cylinder communicates with not only the reservoir but also the pump, the pressurized fluid delivered from the pump is undesirably supplied to the wheel brake cylinder even when the pressure control device is placed in the pressure-decrease state. Therefore, if the duty ratio of the pump actuator driven by the DC power source when the pressure control device is in the pressure decrease state is the same as when the pressure control device is in the other operating states, the rate of decrease of the fluid pressure in the wheel brake cylinder tends to be lower than required, or the wheel brake cylinder pressure may temporarily change. Thus, the braking system suffers from inadequate control of the rate of decrease of the wheel brake cylinder pressure.

Further, the conventional braking system of the recirculating type or pressure-increase-by-pump type which uses a motor as the rotary pump actuator and has a diagnostic device for the motor suffers from a considerably large operating noise generated by the motor and the pump during an operation of the diagnostic device in which the motor and pump are operating at excessively high speeds, with the motor kept energized for a certain length of time.

In sum, all of the conventional braking systems described above suffer from a common problem that the operation of the pump is not sufficiently optimized during operation of the pressure control device or diagnostic device.

SUMMARY OF THE INVENTION

It is therefore a first principle object of the present invention to provide a braking system for a motor vehicle, which assures optimum operation of the pump during operation of the solenoid-operated pressure control device.

It is a first optional object of the invention to provide a braking system wherein the duty ratio signal for intermittently supplying electric power from the DC power source to the pump actuator is determined depending upon an output state of the DC power source, so as to optimize the operation of the pump.

It is a second optional object of the invention to provide a braking system wherein the delivery amount of the pump is made smaller when the pressure control device is placed in the pressure-decrease state than when the pressure control device is placed in the other operating states, so as to optimize the operation of the pump.

It is a second principal object of the present invention to provide a braking system for a motor vehicle, which assures optimum operation of the pump during operation of the diagnostic device for diagnosing a motor as an actuator for the pump.

The first principal object indicated above may be achieved according to a first aspect of the present invention, which provides a braking system for a motor vehicle, comprising: (a) an operator-controlled brake operating member; (b) a master cylinder for generating a fluid pressure according to an amount of operation of the brake operating member; (c) a wheel brake cylinder for operating a wheel brake to brake a wheel of the motor vehicle according to a fluid pressure applied to the wheel brake cylinder, (d) a reservoir for storing a working fluid; (e) a pump for pressurizing the fluid sucked up from the reservoir, and delivering the pressurized fluid toward at least one of the master cylinder and the wheel brake cylinder; (f) a DC power source; (g) a pump actuator driven by the DC power source to operate the pump; (h) an electrically operated pressure control device having a plurality of operating states which are selectively established to electrically control the fluid pressure in the wheel brake cylinder and which include a pressure-increase state for substantial fluid communication of the wheel brake cylinder with at least one of the master cylinder and a delivery side of the pump, and a pressure-decrease state for substantial fluid communication of the wheel brake cylinder with the reservoir; and a pump actuator control device having (i) a power supply portion for intermittently supplying electric power from the DC power source to the pump actuator such that a duty ratio of the pump actuator is controlled in response to a duty ratio signal, and (ii) a signal generating portion for generating the duty ratio signal. The signal generating portion of the pump actuator control device comprises monitoring means for detecting at least one of a physical value which influences an amount of delivery of the pressurized fluid from the pump, and a selected one of the operating states of the electrically operated pressure control device, and optimizing means responsive to the monitoring means, for optimizing a rate of change of the fluid pressure in the wheel brake cylinder during an operation of the electrically operated pressure control device.

The pump actuator may be of a rotary type such as an electric motor, or of a reciprocating type such as a solenoid-operated actuator.

Regarding the pressure-increase state and the pressure-decrease state of the electrically operated pressure control device, the master cylinder and the pump serve as a high-pressure source in the braking system. The "substantial fluid communication of the wheel brake cylinder with at least one of the master cylinder and a delivery side of the pump" means not only the state in which the wheel brake cylinder is completely disconnected from the reservoir and in fluid communication with only the high-pressure source, but also the state in which the wheel brake cylinder is in communication with both the reservoir and the high-pressure source, but preferentially with the high-pressure source. Similarly, the "substantial fluid communication of the wheel brake cylinder with the reservoir" means not only the state in which the wheel brake cylinder is completely disconnected from the high-pressure source and in communication with the reservoir, but also the state in which the wheel brake cylinder is in communication with both the reservoir and the high-pressure source, but preferentially with the reservoir.

The power supply portion is adapted to alternately turn on and off (energize and deenergize) the pump actuator at the duty ratio controlled according to the duty ratio signal generated by the signal generating portion of the pump actuator control device. The period of the duty ratio signal is either constant or variable. In other words, the time length of the duty cycle consisting of an on-time (energization time) and an off-time (deenergization time) is either constant or variable. In either case, the duty ratio signal represents the ratio of the on-time to the period (duty cycle time) which is either constant or variable. The duty ratio may be changed by changing the on-time while keeping the period constant or changing the period while keeping the on-time constant.

In the braking system constructed according to the first aspect of the present invention, the signal generating portion of the pump actuator control device comprises the monitoring means and the optimizing means. The monitoring means detects a suitable physical value which influences the pressure of the pressurized fluid delivered from the pump, and/or the currently established operating state of the electrically operated pressure control device. The optimizing means generates the duty ratio signal, so as to optimize the rate of change of the fluid pressure in the wheel brake cylinder by the pressure control device, depending upon the detected physical value and/or the detected currently established operating state of the pressure control device. Accordingly, the operation of the pump by the pump actuator is adequately controlled so that the fluid pressure in the wheel brake cylinder is increased and/or decreased at a suitable rate.

The first optional object indicated above may be achieved according to a first preferred form of the present first aspect of this invention, wherein the pressurized fluid is delivered from the pump toward the wheel brake cylinder, and the wheel brake cylinder is held in substantial fluid communication with the pump when the pressure control device is placed in the pressure-increase state. In this case, the monitoring means includes output detecting means for detecting as the physical value an output of the DC power source, and the optimizing means includes first signal determining means for determining the duty ratio signal depending upon the output of the DC power source detected by the output detecting means. The output of the DC power source may be an output voltage of the DC power source, for example. In this case, the first signal determining means of the signal generating portion of the pump actuator control device may be adapted to determine the duty ratio signal so that the duty ratio of the pump actuator increases with a decrease in the output voltage of the DC power source detected by the monitoring means. Accordingly, the amount of delivery of the pressurized fluid from the pump is optimized regardless of a variation in the output voltage of the DC power source.

The first signal determining means indicated above may include a controller for generating the duty ratio signal indicative of the duty ratio, which is a ratio of an on-time of the duty ratio signal to a duty cycle period of the duty ratio signal. In this instance, the controller is adapted to determine the duty ratio signal so as to increase the duty ratio with the decrease of the output voltage of an actuator control signal generating circuit for applying to the pump actuator an actuator control signal which corresponds to the duty ratio signal.

The second optional object indicated above may be achieved according to a second preferred form of the present first aspect of the invention, wherein the pressurized fluid is delivered from the pump toward the wheel brake cylinder, and the wheel brake cylinder is held in substantial fluid communication with the pump when the pressure control device is placed in the pressure-increase state, and in substantial fluid communication with the reservoir and the pump when the pressure control device is placed in the pressure-decrease state. In this case, the monitoring means includes state detecting means for determining whether the electrically operated pressure control device is placed in the pressure-decrease state, and the optimizing means includes second signal determining means for determining the duty ratio signal such that the duty ratio of the pump actuator is lower when the pressure control device is placed in the pressure-decrease state than when the pressure control device is placed in the other of the operating states, so that the amount of delivery of the pressurized fluid from the pump is smaller in the pressure-decrease state than in the other operating states. Accordingly, the pressurized fluid delivered from the pump will not have a significant influence on the rate of decrease of the fluid pressure in the wheel brake cylinder by the pressure control device placed in the pressure-decrease state.

The second signal determining means may also include a controller for generating the duty ratio signal indicative of the duty ratio. The controller determines the duty ratio signal so that the duty ratio is lower when the pressure control device is placed in the pressure-decrease position than in the other operating states. In this case, the power supply portion includes an actuator control signal generating circuit for applying to the pump actuator an actuator control signal which corresponds to the duty ratio signal.

According to a third preferred form of the first aspect of the present invention, the signal generating portion of the pump actuator control device further comprises third signal determining means for determining the duty ratio signal depending upon a friction coefficient of a road surface on which the motor vehicle is running. The signal generating portion may further comprise friction-coefficient determining means for determining the friction coefficient. In this case, the third signal determining means is adapted to determine the duty ratio signal such that the duty ratio of the pump actuator increases with an increase of the friction coefficient determined by the friction-coefficient determining means, to thereby increase an amount of delivery of the pressurized fluid from the pump.

The second principal object indicated above may be achieved according to a second aspect of this invention, which provides a braking system for a motor vehicle, comprising: (a) an operator-controlled brake operating member; (b) a master cylinder for generating a fluid pressure according to an amount of operation of the brake operating member; (c) a wheel brake cylinder for operating a wheel brake to brake a wheel of the motor vehicle according to a fluid pressure applied to the wheel brake cylinder, (d) a reservoir for storing a working fluid; (e) a pump for pressurizing the fluid sucked up from the reservoir, and delivering the pressurized fluid toward at least one of the master cylinder and the wheel brake cylinder; (f) a DC power source; (g) an electric motor driven by the DC power source to operate the pump; (h) an electrically operated pressure control device having a plurality of operating states which are selectively established to electrically control the fluid pressure in the wheel brake cylinder and which include a pressure-increase state for substantial fluid communication of the wheel brake cylinder with at least one of the master cylinder and the pump, and a pressure-decrease state for substantial fluid communication of the wheel brake cylinder with the reservoir; (i) a diagnostic device for diagnosing an electric motor as the pump actuator by supplying electric power from the DC power source to the electric motor. The diagnostic device intermittently supplies the electric power from the DC power source to the electric motor such that the motor is alternately turned on and off for a predetermined length of time consisting of alternate on-times and off-times each of which is larger than zero.

In the braking system constructed according to the second aspect of the invention, the diagnostic device for diagnosing the electric motor alternately turns on and off the electric motor for diagnosing the motor. In the present arrangement, the operating speeds of the motor and pump during the diagnostic operation of the motor are made lower than where the motor is kept energized throughout the diagnostic period, whereby the operating noise generated by the motor and pump during the diagnostic operation is accordingly reduced.

In one preferred form of this second aspect of the present invention, the braking system further comprises a motor control device having a power supply portion for supplying electric power from the DC power source to the motor during an operation of the electrically operated pressure control device and during an operation of the diagnostic device, and the diagnostic device includes first diagnosing means for diagnosing the power supply portion to detect electrical disconnection of the power supply portion, and second diagnosing means operated after an operation of the first diagnosing means, for diagnosing the electric motor to detect a failure of the electric motor to normally operate when the power supply portion is commanded to supply the electric power to the electric motor. The first diagnosing means commands the power supply portion to intermittently supply the electric power to the DC power source to the electric motor, and the second diagnosing means commands the power supply portion to stop a supply of the electric power to the electric motor.

The first diagnosing means may include a voltage monitoring circuit for detecting an output voltage which is applied from the power supply portion to the electric motor when the power supply portion is commanded by the first diagnosing means to supply the electric power to the electric motor. In this instance, the first diagnosing means determines a presence of the electrical disconnection of the power supply portion if the output voltage detected by the voltage monitoring means is lower than a predetermined reference voltage.

The second diagnosing means may include regenerative voltage monitoring means for monitoring a regenerative voltage generated by the electric motor. In this instance, the second diagnosing means determines a presence of the failure of the electric motor if the regenerative voltage detected by the regenerative voltage monitoring means is lower than a predetermined reference voltage when the electric power is not supplied from the power supply portion to the electric motor.

The braking system constructed according to the first or second aspect of this invention described above may be an X-crossing type braking system for a four-wheel motor vehicle including a front right, a front left, a rear right and a rear left wheel, the X-crossing type braking system having two pressure application sub-systems which are connected to respective two mutually independent pressurizing chambers of the master cylinder, each of the two pressure application sub-systems including (a) a front brake cylinder passage connecting a corresponding one of the two pressurizing chambers of the master cylinder and a front wheel brake cylinder for braking a corresponding one of the front right and left wheels, (b) a rear brake cylinder passage connecting the front brake cylinder passage and a rear wheel brake cylinder for braking a corresponding one of the rear right and left wheels, (c) a first solenoid-operated shut-off valve which is disposed in a portion of the front brake cylinder passage between the master cylinder and a point of connection of the front and rear brake cylinder passages, the first solenoid-operated shut-off valve being open and closed respectively in a normal braking mode and an anti-lock braking mode of the front and rear wheel brake cylinders, (d) a normally-open second solenoid-operated shut-off valve disposed in the rear brake cylinder passage, (e) a reservoir passage connected at one of opposite ends thereof to a portion of the rear brake cylinder passage between the second solenoid-operated shut-off valve and the rear wheel brake cylinder, (f) a normally-closed third solenoid-operated shut-off valve disposed in the reservoir passage, (g) a pump passage connected at one of opposite ends thereof to the reservoir and at the other end thereof to a portion of the rear brake cylinder passage between the second solenoid-operated shut-off valve and the point of connection, the pump being disposed in the pump passage, (h) a controller for controlling the first, second and third solenoid-operated shut-off valves for controlling the fluid pressures in the front and rear wheel brake cylinders in the anti-lock braking mode, and (i) a pressure reducing valve device provided in each of the two pressure application sub-systems and disposed between the pump and the front wheel brake cylinder, for reducing the pressure of the pressurized fluid delivered from the pump and applying the reduced pressure to the front wheel brake cylinder.

The pressure reducing valve device may include a check valve for permitting a flow of the fluid in a first direction from the pump toward the front wheel brake cylinder when a pressure on one of opposite sides of the check valve nearer to the pump is higher than a pressure on the other of the opposite sides nearer to the front wheel brake cylinder by more than a predetermined amount which is not zero. The check valve inhibits a flow of the fluid in a second direction opposite to the first direction.

BRIEF DESCRIPTION OF THE DRAWINGS

The above and optional objects, features and advantages of the present invention will be better understood by reading the following detailed description of a presently preferred embodiment of the invention, when considered in connection with the accompanying drawings, in which.

DETAILED DESCRIPTION OF THE PREFERRED EMBODIMENTS

Figure 1:
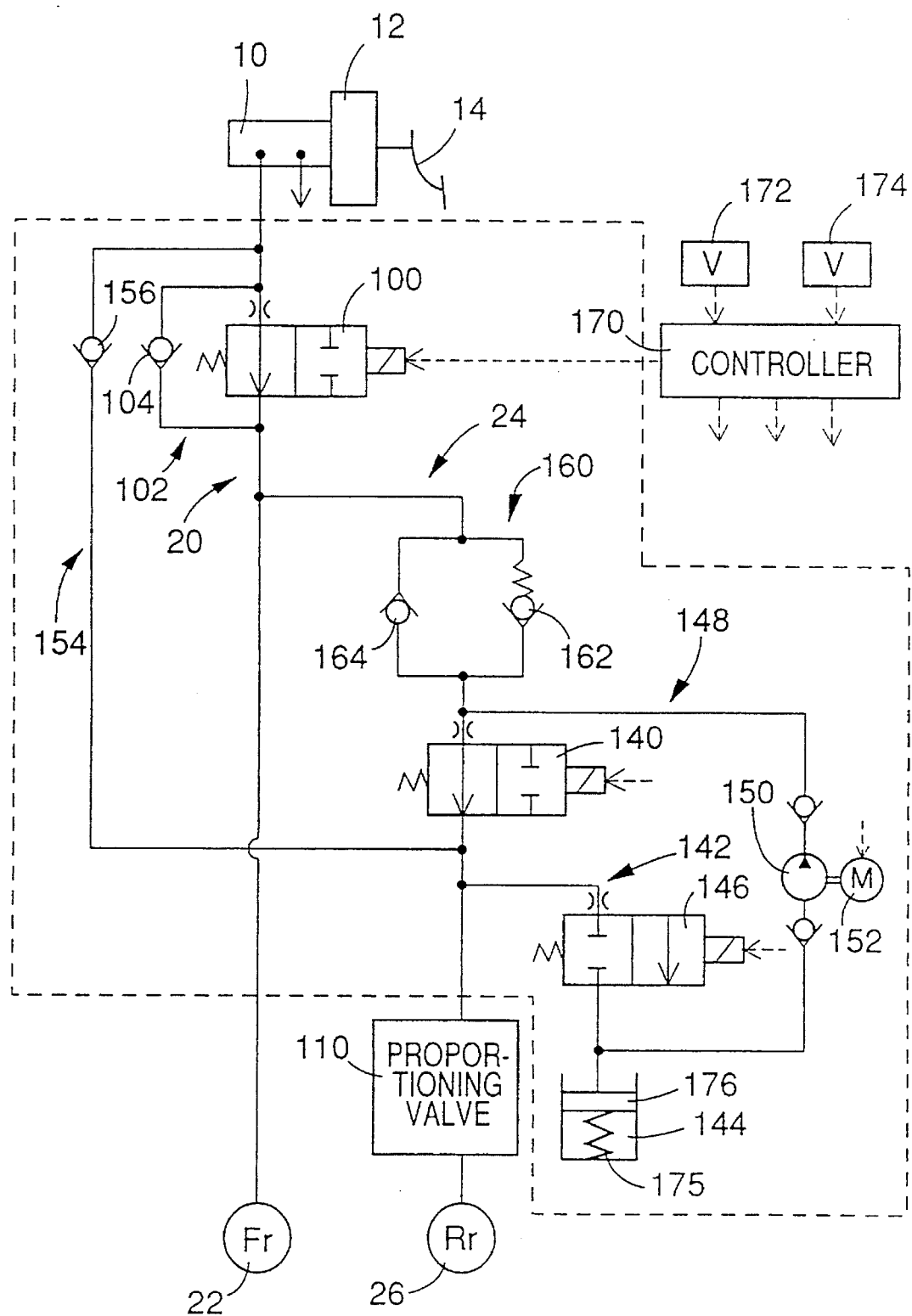
FIG. 1 is a schematic view illustrating an anti-lock braking system constructed according to one embodiment of this invention.

Referring first to FIG. 1, there will be described one embodiment of the present invention in the form of a braking system of the diagonal or X-crossing type for a motor vehicle.

In FIG. 1, reference numeral 10 denotes a master cylinder. The master cylinder 10 is of a tandem type in which two mutually independent fluid pressurizing chambers are disposed in series. The master cylinder 10 is linked with a brake operating member in the form of a brake pedal 14 through a booster 12. Upon operation or depression of the brake pedal 14 by the driver or operator of the motor vehicle, equal fluid pressures are mechanically generated in the two pressurizing chambers of the master cylinder 10, depending upon the depression force acting on the brake pedal 14. The depression force is one form of an amount of operation of the brake pedal 14.

One of the pressurizing chambers of the master cylinder 10 is connected to brake cylinders of hydraulically operated brakes for a front left wheel and a rear right wheel of the vehicle, while the other pressurizing chamber is connected to brake cylinders of hydraulically operated brakes for a front right wheel and a rear left wheel of the vehicle. These brake cylinders are hereinafter referred to as "wheel brake cylinders". Thus, the braking system has two mutually independent pressure application sub-systems one of which has the front left wheel brake cylinder and the rear right wheel brake cylinder, and the other of which has the front right wheel brake cylinder and the rear left wheel brake cylinder. Since the two pressure application sub-systems are identical in construction with each other, only one of these sub-systems is illustrated in FIG. 1 and will be described below.

In each pressure application sub-system, the corresponding pressurizing chamber of the master cylinder 10 is connected to the front wheel brake cylinder 22 through a front brake cylinder passage 20. A rear brake cylinder passage 24 is connected at one end thereof to the front wheel brake cylinder passage 20 and at the other end to the rear wheel brake cylinder 26.

A normally-open first solenoid-operated shut-off valve 100 is disposed in a portion of the front brake cylinder passage 20 between the master cylinder 10 and the point of connection of the front and rear brake cylinder passages 20, 24. Further, a by-pass return passage 102 is provided in parallel with the first shut-off valve 100, so as to by-pass the shut-off valve 100. The by-pass return passage 102 is provided with a check valve 104, which inhibits a flow of the brake fluid in a direction from the master cylinder 10 toward the front wheel brake cylinder 20, and permits a flow of the brake fluid in the reverse direction with the valve opening pressure difference being substantially zero.

In the rear brake cylinder passage 24, there is provided a proportioning valve 110 (hereinafter referred to as "P valve 110"). The P valve 110 is a pressure reducing valve which operates so that the fluid pressure as generated by the master cylinder 10 (hereinafter referred to as "master cylinder pressure") is applied to the rear wheel brake cylinder 26 without reduction of the master cylinder pressure, until the master cylinder pressure reaches a predetermined threshold level, and so that the master cylinder pressure higher than the threshold level is reduced at a predetermined ratio, so that the reduced pressure is applied as the braking pressure to the rear wheel brake cylinder 26. The reduction of the master cylinder pressure by the P valve 110 is intended to avoid a higher locking tendency of the rear wheels than a locking tendency of the front wheels due to a movement of a vehicle load in the direction from the rear wheels toward the front wheels upon brake application during forward running of the vehicle.

A normally-open second solenoid-operated shut-off valve 140 is disposed in a portion of the rear brake cylinder passage 24 between the P valve 110 and the point of connection of the front and rear brake cylinder passages 20, 24. A reservoir passage 142 is connected at one end thereof to a portion of the rear brake cylinder passage 24 between the P valve 110 and the second shut-off valve 140, and at the other end to a reservoir 144. A normally-closed third solenoid-operated shut-off valve 146 is provided in the reservoir passage 142.

A pump passage 148 is connected at one end thereof to the reservoir 144 and at the other end to the rear brake cylinder passage 24. A pump 150 is provided in the pump passage 148, for sucking and pressurizing the brake fluid in the reservoir 144. The pump 150 is of a plunger type driven by a DC motor 152 to deliver the pressurized fluid in an intermittent manner. The electric motor 152 is one form of a rotary type actuator for driving the pump 150. The output end or delivery end (the other end indicated above) of the reservoir passage 148 is connected to a portion of the rear brake cylinder passage 24 on the upstream side of the second shut-off valve 140, namely, on the side of the second shut-off valve 140 nearer to the master cylinder 10.

A return passage 154 is connected at one end thereof to a portion of the rear brake cylinder passage 24 between the P valve 110 and the second shut-off valve 140, and at the other end to a portion of the front brake cylinder passage 20 between the master cylinder 10 and the first shut-off valve 100. A check valve 156, which is provided in the return passage 154, inhibits a flow of the brake fluid in a direction from the master cylinder 10 toward the rear wheel brake cylinder 26, and permits a flow of the fluid in the reverse direction with the valve opening pressure difference being substantially zero.

A pressure reducing valve device 160 is disposed in a portion of the rear brake cylinder passage 24 between the point of connection of the rear brake cylinder passage 24 and the pump passage 148 and the point of connection of the front and rear brake cylinder passages 20, 24.

The pressure reducing valve device 160 is provided for the reason described below.

In a conventional braking system equipped with a load-sensing type proportioning valve, there is a tendency that the actual distribution of the front and rear wheel braking forces more or less deviates from an ideal distribution curve, in a direction that causes a decrease in the rear wheel braking force, particularly when the motor vehicle is running with a full load (nominal number of passengers including the driver, or nominal maximum cargo load) and when the front and rear wheel braking forces are relatively small or close to zero, that is, smaller than the point at which the load-sensing type proportioning valve begins to reduce the rear wheel braking force with respect to the front wheel braking force. This point is the point at which the distribution line of the proportioning valve is bent. For instance, the above tendency of deviation of the actual distribution of the front and rear wheel braking forces from the ideal distribution curve occurs immediately after the brake pedal is depressed, or upon brake application during vehicle running on a road surface having a relatively low friction coefficient. The above tendency results in insufficient rear wheel braking force even where the rear wheel does not suffer from locking. This tendency occurs because the braking system is designed so that the distribution of the front and rear wheel braking forces while these forces are relatively small is constant irrespective of whether the vehicle is running with a full load or a minimum load (without passengers or cargo load), and so that the front and rear distribution ratio while the wheel braking forces are relatively small is determined so as to avoid locking of the rear wheel prior to the front wheel during the minimum-load run of the vehicle. To solve this drawback, it is necessary to provide two different front and rear distribution lines which are selectively established while the wheel braking forces are relatively small. To this end, the pressure reducing valve device 160 is provided so that the delivery pressure of the pump 150 is reduced by the valve device 160 and applied to the front wheel brake cylinder 22 during the anti-lock pressure control operation of the braking system, and so that the pressure in the rear wheel brake cylinder 26 is higher during the anti-lock pressure control operation than during the normal pressure control operation. Thus, the pressure reducing valve device 160 makes it possible to maximize the rear wheel braking force so as to avoid the locking of the rear wheel and shorten the required braking distance of the vehicle when the front and rear wheel braking forces are relatively small.

The first and second check valves 162, 164 are disposed in parallel with each other and have opposite directions in which the brake fluid is permitted to flow.

Figure 2:
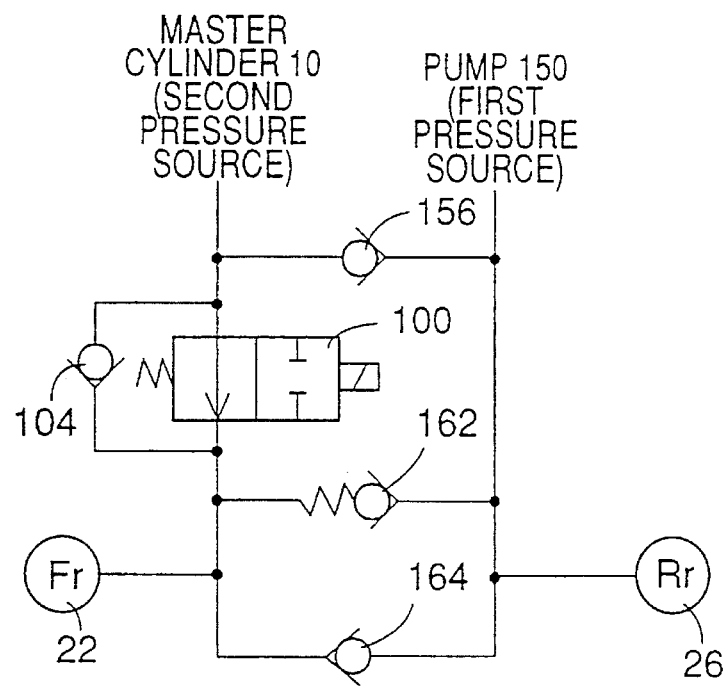
FIG. 2 is a hydraulic circuit diagram schematically showing flows of a brake fluid to and from a master cylinder, a pump, a pressure reducing valve device and front and rear wheel brake cylinders in the braking system of FIG. 1.

Referring next to FIG. 2, there will be explained flows of the brake fluid to and from the master cylinder 10, pump 150, pressure reducing valve device 160 and front and rear wheel brake cylinders 22, 26.

During the normal pressure control operation of the present braking system without an operation of the pump 150, the brake fluid pressurized by the master cylinder 10 is supplied to the front wheel brake cylinder 22 through the opened first shut-off valve 100, and to the rear wheel brake cylinder 26 through the first shut-off valve 100 and the second check valve 164 of the pressure reducing valve device 160. Since the opening pressure difference of the second check valve 164 is substantially zero, almost the same braking pressures are applied to the front and rear wheel brake cylinders 22, 26.

When the pump 150 is operated during the anti-lock pressure control operation, on the other hand, the first shut-off valve 100 is closed, and the brake fluid delivered from the pump 150 is supplied to the front wheel brake cylinder 22 through the first check valve 162, and supplied to the rear wheel brake cylinder 26 without flowing through the first check valve 162. Since the opening pressure difference of the first check valve 162 is not substantially zero, the braking pressure in the front wheel brake cylinder 22 is made lower than that in the rear wheel brake cylinder 26 by an amount corresponding to the preset opening pressure difference of the first check valve 162.

During the normal pressure control operation, the master cylinder 10 serves as a pressure source (second pressure source as indicated in FIG. 2), and the same braking pressure as generated by the master cylinder 10 is applied to the front and rear wheel brake cylinders 22, 26. During the anti-lock pressure control operation, on the other hand, the pump 150 serves as a pressure source (first pressure source as indicated in FIG. 2), and the pressure as generated by the pump 150 is applied to the rear wheel brake cylinder 26 while the pressure generated by the pump 150 and reduced by the first check valve 162 is applied to the front wheel brake cylinder 22, whereby the pressure in the front wheel brake cylinder 22 is lower than the pressure in the rear wheel brake cylinder 26, so that the distribution of the front and rear braking forces is optimized to maximize the rear wheel braking pressure or force for thereby shortening the required braking distance of the vehicle while avoiding the locking of the rear wheel, during the full-load run of the vehicle, even when the front and rear wheel braking forces are relatively small, namely, smaller than the point of bending of the distribution line of the P valve 110.

In FIG. 1, a block indicated by dashed lines denotes a brake unit which incorporates the above-described mechanical components of the braking system, except the master cylinder 10, booster 12, P valve 110 and front and rear wheel brake cylinders 22, 26. In other words, the mechanical portion of the braking system consists of six components: master cylinder 10; booster 12; brake unit; P valve 110; front wheel brake cylinders 22; and rear wheel brake cylinder 26.

The solenoids of the first, second and third solenoid-operated shut-off valves 100, 140 and 146 are connected to a controller 170, which is principally constituted by a computer, A/D converters and drivers. The computer incorporates a central processing unit (CPU), a read-only memory (ROM), a random-access memory (RAM) and a bus. The controller 170 selectively opens and closes the shut-off valves 100, 140, 146 as needed.

The controller 170 is adapted to receive output signals of wheel speed sensors 172, 174, which represent the rotating speeds of the front and rear wheels. The controller 170 controls the shut-off valves 100, 140, 146 depending on the output signals of the wheel speed sensors 172, 174. The controller 170 also controls the motor 152 to control the pump 150.

There will next be described in detail an operation of the controller 170 for controlling the shut-off valves 100, 140 and 146.

During braking of the vehicle, the controller 170 monitors the rotating conditions (e.g., deceleration values, slip amounts and slip ratios) of the individual wheels of the vehicle on the basis of the output signals of the wheel speed sensors 172, 174, and determine whether any wheels have a locking tendency. This determination on the locking tendencies of the four wheels is effected by estimating the vehicle running speed on the basis of the detected rotating speeds of the four wheels, comparing the rotating speed of each wheel with the estimated vehicle speed, and determining, on the basis of a result of this speed comparison, whether each wheel has a locking tendency. The estimated vehicle speed values obtained in the present and last control cycles are stored in the RAM. The estimated vehicle speed value in the last control cycle is stored in the RAM for the reason which will be apparent from the following description.

The controller 170 controls the shut-off valves 100, 140, 146 in a selected one of seven pressure control modes as indicated in TABLE 1 below, to control the pressures in the wheel brake cylinders 22, 26. These seven pressure control modes are established by respective different combinations of the open and closed states of the three shut-off valves 100, 140, 146.

TABLE 1

| Mode | States of Shut-Off Valves | | | Pressure Control States of Front and Rear Brake Cylinders | |
|---|---|---|---|---|---|
|  | 1 | 2 | 3 | Front | Rear |
| 1 | O | O | C | M/C Increase | M/C Increase |
| 2 | O | C | C | M/C Increase | Hold |
| 3 | O | C | O | M/C Increase | Reduction |
| 4 | C | O | C | Pump Increase | Pump Increase |
| 5 | C | C | C | Pump Increase | Hold |
| 6 | C | C | O | Pump Increase | Reduction |
| 7 | C | O | O | Reduction | Reduction |

"C" and "O" in TABLE 1 represent the closed and open states of the shut-off valves, respectively.

To effect the anti-lock control of the wheel braking pressures, the controller 170 performs the following steps: (a) determining whether any one of the front and rear wheels of the two pressure application sub-systems has a locking tendency, and if it is determined that any wheel has a locking tendency, determining on the basis of the rotating condition of the wheel a pressure control command (selected from among a pressure reducing command, a pressure holding command and a pressure increasing command) which should be generated to control the braking pressure in the brake cylinder of the wheel in question; (b) then selecting one of the seven pressure control modes depending upon the determined pressure control command (pressure reducing, holding or increasing command) and depending upon whether the wheel having the locking tendency is a front or rear wheel; and (c) then controlling the pressure in the brake cylinder of the wheel in question in the selected pressure control mode. To this end, the ROM of the controller 170 stores routines for determining the pressure control commands for the individual wheels on the basis of the rotating conditions of the wheels, and routines for controlling (turning on or off) the solenoids of the respective shut-off valves 100, 140, 146 according to the determined pressure control commands.

The anti-lock pressure control operation of the present braking system will be described in detail, assuming that the front wheel associated with one of the two pressure application sub-systems has a locking tendency without a locking tendency of the rear wheel.

In this case, the pressure in the front wheel brake cylinder 22 should be first reduced. However, the seven pressure control modes available do not include a mode for reducing only the pressure in the front wheel brake cylinder 22, as is apparent from TABLE 1. Therefore, the seventh pressure control mode is selected to reduce the pressures in both of the front and rear wheel brake cylinders 22, 26.

In the seventh pressure control mode, the solenoid of the first shut-off valve 100 is turned ON to close this shut-off valve 100, so that the front and rear wheel brake cylinders 22, 26 are disconnected from the master cylinder 10. Further, the solenoid of the third shut-off valve 146 is turned ON to open this valve 146, so that the pressures in the front and rear wheel brake cylinders 22, 26 are reduced. Described more specifically, the front wheel brake cylinder 22 is brought into communication with the reservoir 144 through the second check valve 164, normally-open second shut-off valve 140 and now opened third shut-off valve 146, whereby the brake fluid is permitted to flow from the front wheel brake cylinder 22 to the reservoir 144. At the same time, the rear wheel brake cylinder 26 is communicated with the reservoir 144 through the P valve 110 and the opened third shut-off valve 146, and the brake fluid is permitted to flow from the rear wheel brake cylinder 26 to the reservoir 144. Thus, the braking pressures in both of the front and rear wheel brake cylinders 22, 26 are reduced in the seventh pressure control mode.

The seventh pressure control mode of operation is terminated when the locking tendency of the front wheel is eliminated or considerably reduced as a result of the reduction in the wheel brake cylinders 22, 26. Then, the pressure in the front and rear wheel brake cylinders 22, 26 are controlled in a selected one of the fourth, fifth, sixth and seventh pressure control modes, depending upon the locking tendencies of the front and rear wheels.

Figure 4:
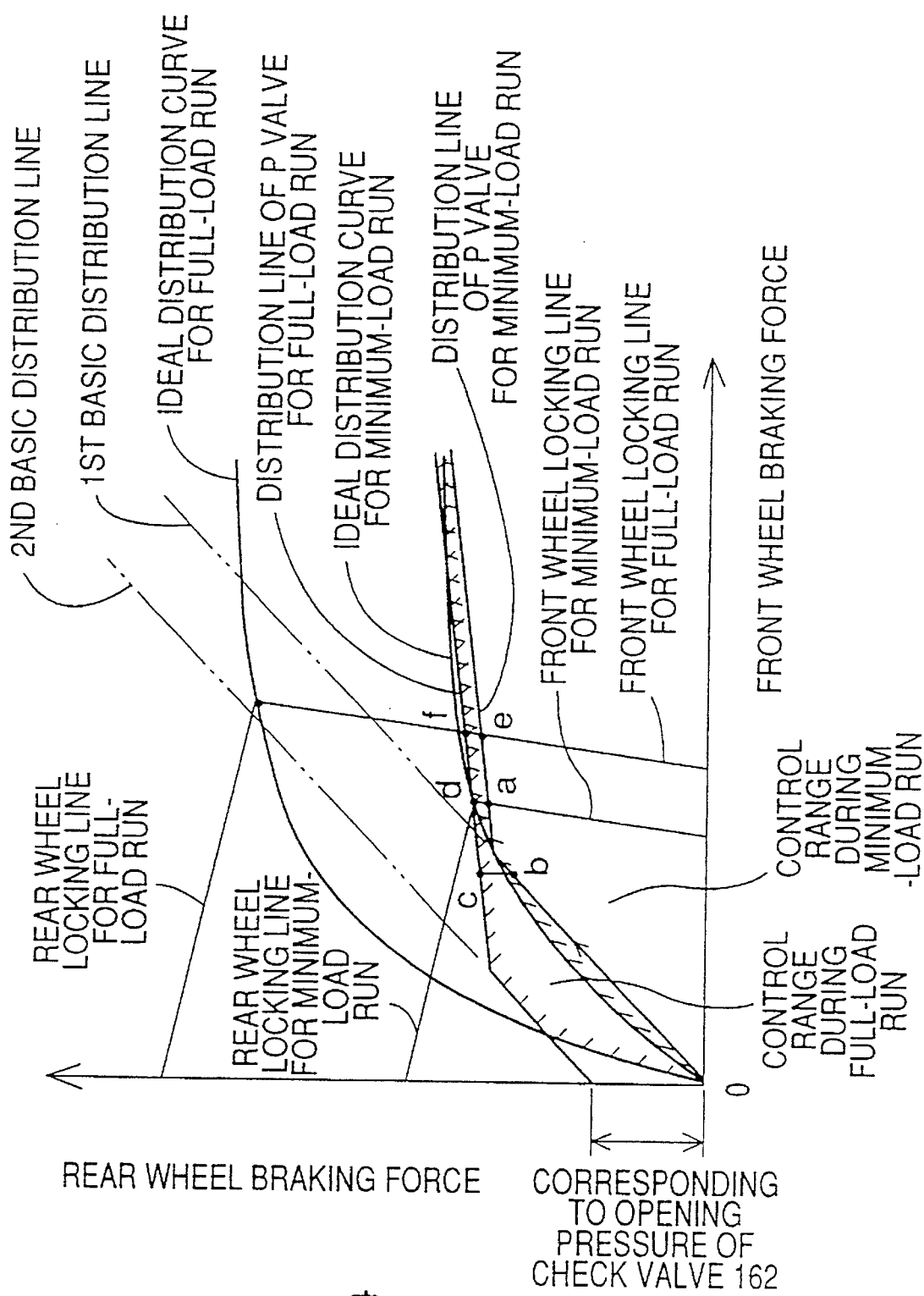
FIG. 4 is a graph explaining a relationship between the braking forces of the front and rear wheels as controlled in the braking system of FIG. 1.

In the fourth pressure control mode, the first and third shut-off valves 100, 146 are both closed, while the second shut-off valve 140 is opened, so that the fluid delivered from the pump 150 is returned to the front wheel brake cylinder 22 through the first check valve 162, and to the rear wheel brake cylinder 26 through the opened second shut-off valve 140 and the P valve 110, whereby the pressures in the front and rear wheel brake cylinders 22, 26 are both increased. In this fourth pressure control mode, the pressure of the fluid delivered from the pump 150 is reduced by the first check valve 162 by the preset opening pressure difference of the check valve 162. Therefore, the braking pressure in the front wheel brake cylinder 22 is lower than the braking pressure in the rear wheel brake cylinder 26, by the opening pressure difference of the first check valve 162, when the braking pressures are increased. The distribution of the front and rear wheel braking forces which corresponds to the thus established distribution of the pressures in the front and rear wheel brake cylinders 22, 26 is indicated in FIG. 4 as the second basic distribution line.

In the fifth pressure control mode, the three shut-off valves 100, 140, 146 are all closed, and the pressure in the front wheel brake cylinder 22 is increased by operation of the pump 150 as in the fourth mode, while the pressure in the rear wheel brake cylinder 26 is held constant.

Figure 3:
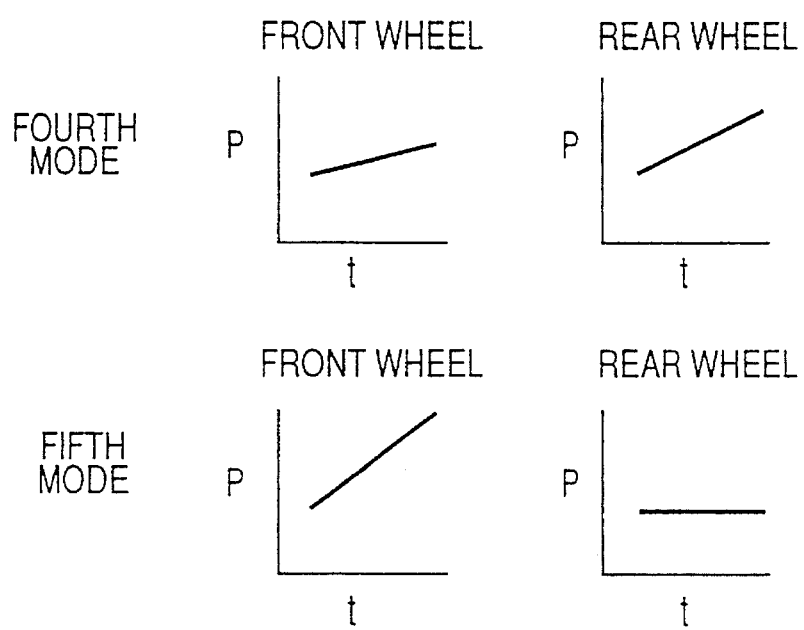
FIG. 3 is a graph explaining changes in the front and rear wheel brake cylinder pressures as controlled differently in an anti-lock fashion in fourth and fifth modes of operation of the braking system of FIG. 1.

In the fifth pressure control mode, the brake fluid delivered from the pump 150 is not returned to the rear wheel brake cylinder 30, but is returned to only the front wheel brake cylinder 22. In the fourth mode, on the other hand, the brake fluid from the pump 150 is also returned to the rear wheel brake cylinder 26. Accordingly, the rate of increase in the pressure in the front wheel brake cylinder 22 is higher in the fifth mode than in the fourth mode, as indicated in FIG. 3. As also shown in this figure, the pressure in the rear wheel brake cylinder 26 is increased in the fourth mode while the pressure in the same cylinder is held constant in the fifth mode.

In the sixth pressure control mode, the first and second shut-off valves 100, 140 are both closed while the third shut-off valve 146 is opened, whereby the pressure in the front wheel brake cylinder 22 is increased as in the fourth mode, while the pressure in the rear wheel brake cylinder 26 is reduced.

In principle, the first, second and third pressure control modes are not used for the anti-lock control of the braking pressure of the front wheel brake cylinder 22. In these three modes, the first shut-off valve 100 is opened. During the anti-lock pressure control operation, it is desirable to disconnect the front and rear wheel brake cylinders 22, 26 from the master cylinder, in order to reduce the delivery pressure of the pump 150 and minimize the pressure pulsation of the fluid delivered from the pump 150. However, if it becomes necessary to increase the pressure in the front or rear wheel brake cylinder 22, 26 after the reservoir 144 is entirely evacuated with the entire volume of the fluid pumped up by the pump 150, an appropriate one of the first, second and third pressure control modes is established to increase the pressure in the wheel brake cylinder in question with the pressure generated by the master cylinder 10.

When the pressure in the front wheel brake cylinder 22 is increased by operation of the pump 150 in the fourth or fifth pressure control mode, the check valve 104 functions as a pressure relief valve to prevent the front wheel braking pressure from exceeding the master cylinder pressure.

While the operation of the braking system upon occurrence of a locking tendency of the front wheel without a locking tendency of the rear wheel, there will be described an operation upon occurrence of a locking tendency of the rear wheel without a locking tendency of the front wheel.

In this case, it is necessary to first reduce the pressure in the rear wheel brake cylinder 26. To this end, the braking system is first placed in the third pressure control mode wherein the first and third shut-off valve 100, 146 are opened while the second shut-off valve 140 is closed, whereby substantially no anti-lock pressure control is effected with respect to the pressure in the front wheel brake cylinder 22. That is, the pressure in the front wheel brake cylinder 22 is increased by the pressure generated by the master cylinder 10, while the pressure in the rear wheel brake cylinder 26 is reduced through the opened third shut-off valve 146.

Subsequently, the first through seventh pressure control modes are selectively established by the controller 170 as needed. While the front wheel does not have a locking tendency, the first, second and third pressure control modes are selectively established, and only the pressure in the rear wheel brake cylinder is controlled in the anti-lock manner. If the front wheel as well as the rear wheel has a locking tendency, or if only the front wheel has a locking tendency with the locking tendency of the rear wheel being eliminated, the front and rear wheel braking pressures or the front wheel braking pressure is/are controlled in the anti-lock manner as in the case where the front wheel has a locking tendency without a locking tendency of the rear wheel.

The rear wheel has a locking tendency without a locking tendency of the front wheel if the front wheel lies on an area of an uneven friction-coefficient road surface which area has a relatively high friction coefficient, while the rear wheel lies on an area of the road surface having a relatively low friction coefficient. In this case, it is preferable to maximize the front wheel braking pressure while preventing the locking of the front wheel, so that the relatively high friction coefficient of the road surface area is utilized by the front wheel to reduce the braking distance of the vehicle. On the other hand, it is preferable to maximize the cornering force acting on the rear wheel, for improving the steering or directional stability of the vehicle. In other words, it is desired that the braking system be capable of increasing the front wheel braking pressure without increasing the rear wheel braking pressure, or capable of reducing the rear wheel braking pressure without reducing the front wheel braking pressure. In the present embodiment, the fifth or sixth pressure control mode is established to increase the front wheel braking pressure without an increase in the rear wheel braking pressure, and the sixth pressure control mode is established to reduce the rear wheel braking pressure without a decrease in the front wheel braking pressure. Thus, the present embodiment assures not only reduction in the required braking distance of the vehicle but also an improvement of the steering stability of the vehicle in the case of braking of the vehicle while the front wheel is on the high friction-coefficient area of an uneven friction-coefficient road surface while the rear wheel is on the low friction-coefficient area.

There will be described an advantageous effect of the present anti-lock braking system, by reference to the graph of FIG. 4.

In a normal braking of the vehicle initiated by depression of the brake pedal 14 by the vehicle driver, the master cylinder 10 rather than the pump 150 functions as the pressure source, and the master cylinder pressure is applied to the front wheel brake cylinder 22, irrespective of the existence of the pressure reducing valve device 160. Accordingly, the front-rear force distribution point is moved from the zero point of the coordinate system of the graph of FIG. 4, along a first basic distribution line and along a distribution line of the P valve 110 for the minimum-load run of the vehicle.

If the vehicle is in the minimum-load run (one form of a vehicle run with a relatively small load), the force distribution point reaches a point "a" as indicated in FIG. 4, when the depression force acting on the brake pedal 14 has been increased to increase the front wheel braking pressure to a level slightly lower than a level at which the front wheel begins to be locked on the road surface. When the anti-lock control of the front wheel braking pressure is started due to an excessive degree of locking of the front wheel as a result of a further increase in the depression force of the brake pedal 14, both the front wheel braking pressure and the rear wheel braking pressure are reduced in the seventh pressure control mode. Consequently, the force distribution point is moved from the point "a" in the left direction, as indicated in the graph of FIG. 4, to a point which lies on the first basic distribution line or the distribution line of the P valve 110 for the minimum-load run. In this specific example, the force distribution point is moved to point "b".

If the fourth pressure control mode of operation is initiated to increase the front and rear wheel braking pressures as a result of elimination of the locking tendency of the front wheel, the brake fluid delivered from the pump 150 is supplied to the front wheel brake cylinder 22, with the pressure reduction corresponding to the opening pressure difference of the first check valve 162. However, the brake fluid delivered from the pump 150 is supplied to the rear wheel brake cylinder 26, without the pressure reduction. It is noted that some volume of the brake fluid has been stored in the reservoir 144 by the time the locking tendency of the front wheel has been eliminated, that is, when the fourth pressure control mode of operation is initiated. With the pump 150 being operated, the front wheel braking pressure and force are held constant and only the rear wheel braking pressure and force are increased, until the first check valve 162 is opened. Accordingly, the force distribution point is moved from the point "b" in the positive direction along the vertical axis of the graph of FIG. 4 (along which the rear wheel braking force is taken), to a point which lies on a second basic distribution line or a distribution line of the P valve 110 for the full-load run. In this specific example, the force distribution point is moved to point "c". Subsequently, the force distribution point is moved from the point "c", along the distribution line of the P valve 110 for the full-load run, in the direction of increasing the rear wheel braking force, and eventually reaches point "d" of intersection between a rear wheel locking line for the minimum-load run and the distribution line of the P valve 110 for the full-load run. Then, the rear wheel braking pressure is controlled in the anti-lock manner so as to eliminate the locking tendency of the rear wheel.

The second basic distribution line and the distribution line of the P valve 110 for the full-load run are obtained by translating respectively the first basic distribution line and the distribution line of the P valve 110 for the minimum-load run, in the positive direction along the vertical axis of the graph of FIG. 4, by a distance corresponding to the opening pressure difference of the first check valve 162, as indicated in FIG. 4.

If the vehicle is in the full-load run (one form of a vehicle run with a relatively large load), the front-rear force distribution point is moved to point "e" as indicated in FIG. 4, when the depression force acting on the brake pedal 14 is increased to increase the front wheel braking force to a level slightly lower than the wheel locking level. A further increase in the brake pedal depression force will cause initiation of anti-lock control of the front wheel braking pressure. As a result, the force distribution point is moved to the point "b" indicated above.

When the fourth pressure control mode of operation is initiated to increase the front and rear wheel braking pressures as a result of elimination of the locking tendency of the front wheel, the force distribution point is moved from the point "b" in the positive direction of the vertical axis to the point "c" as in the above case. With a further increase in the front and rear wheel braking pressures by operation of the pump 150, the force distribution point is further moved from the point "c" along the distribution line of the P valve 110 for the full-load run, and eventually reaches point "f" of intersection between the distribution line of the P valve 110 for the full-load run and a front wheel locking line for the full-load run. Thereafter, the anti-lock control is effected to eliminate the locking tendency of the front wheel.

It will be understood from the foregoing explanation that the provision of the pressure reducing valve device 160 assures maximum rear wheel brake cylinder pressure or rear wheel braking force without locking of the rear wheel so as to shorten the required braking distance of the vehicle, during the full-load run of the vehicle, even when the front and rear wheel braking forces are relatively small, that is, smaller than the point of bending of the distribution line of the P valve 110.

An experiment as described below was conducted on the present braking system, in relation to the motor 152 for driving the pump 150. That is, a DC current was intermittently supplied to the motor 152 from a DC power source in the form of a battery installed on the motor vehicle, such that the motor 152 is alternately turned on and off (alternately energized and deenergized) at a predetermined constant duty cycle or duty ratio D (ratio of an on-time or energization time to the entire control period or interval which consists of the on-time and an off-time or deenergization time). Neither the on-time nor the off-time is zero. That is, the on-time and the off-time are both larger than zero. The duty ratio may be a ratio of the ON time to the OFF time. The experiment revealed the following drawback associated with the operation of the motor 152.

The duty ratio D was selected to be an intermediate value between a value suitable for a vehicle run on a road surface (hereinafter referred to as "high-friction-coefficient road surface") having a relatively high friction coefficient and a value suitable for a vehicle run on a road surface (hereinafter referred to as "low-friction-coefficient road surface") having a relatively low friction coefficient. With the motor 152 operated at the thus determined duty ratio D, the braking system suffered from an inadequate rate of increase of the pressures in the front and rear wheel brake cylinders 22, 26, and resulting deteriorated braking performance with an insufficient braking force during the vehicle run on the high-friction-coefficient road surface, and deteriorated steering stability during the vehicle run on the low-friction-coefficient road surface. These problems will be further analyzed.

Figure 5:
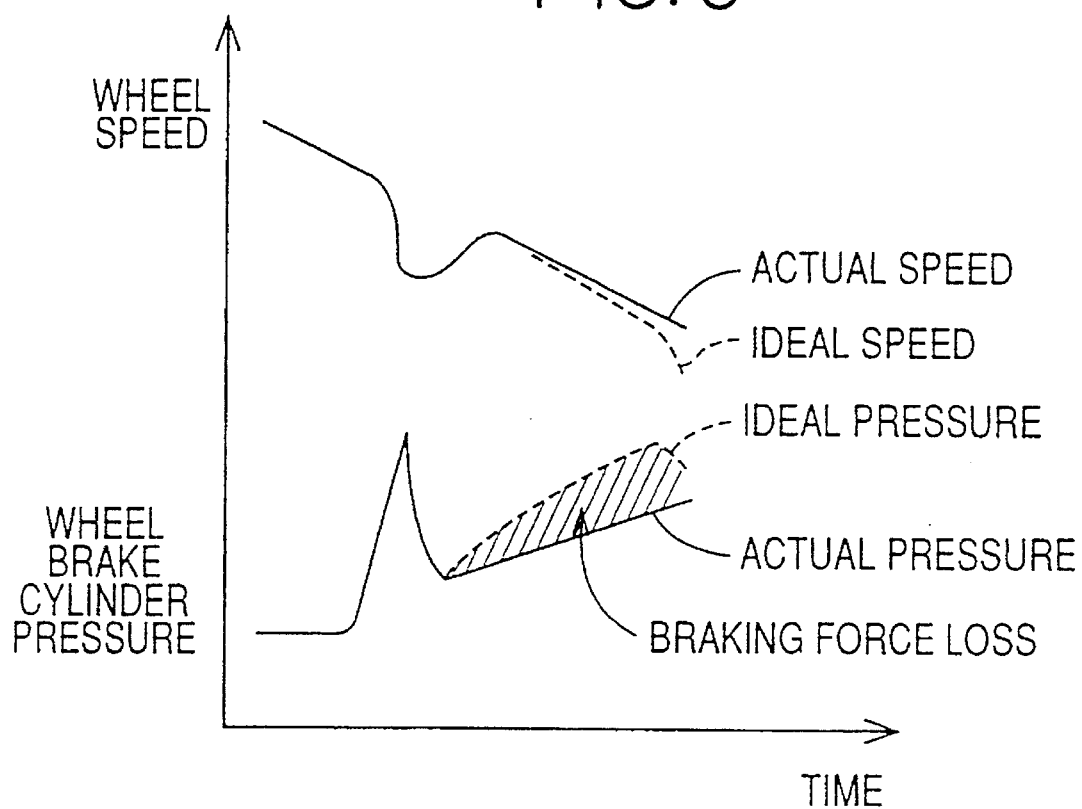
FIG. 5 is a graph explaining a problem experienced by a conventional braking system during running of a motor vehicle on a road surface having a relatively high friction coefficient.

During an anti-lock control pressure control operation of the braking system during a vehicle run on the high-friction-coefficient road surface, the actual pressure in the wheel brake cylinder 22, 26 changes as indicated by lower solid line in the graph of FIG. 5, for example. That is, the actual wheel brake cylinder pressure during the vehicle run on the high-friction-coefficient road surface is relatively high, and the delivery amount of the pump 150 is relatively small, whereby the rate of increase of the wheel brake cylinder pressure as controlled in the anti-lock manner tends to be low. This causes the actual wheel brake cylinder pressure to be lower than an ideal value as indicated by lower dashed line in FIG. 5. The difference between the actual and ideal wheel brake cylinder pressure causes a loss of the wheel braking force, resulting in the actual wheel speed (indicated by upper solid line in FIG. 5) higher than an ideal speed (indicated by upper dashed line in FIG. 5). As a result, the slip ratio of the wheel is excessively reduced, and the braking does not cause sufficient deceleration of the vehicle.

Figure 6:
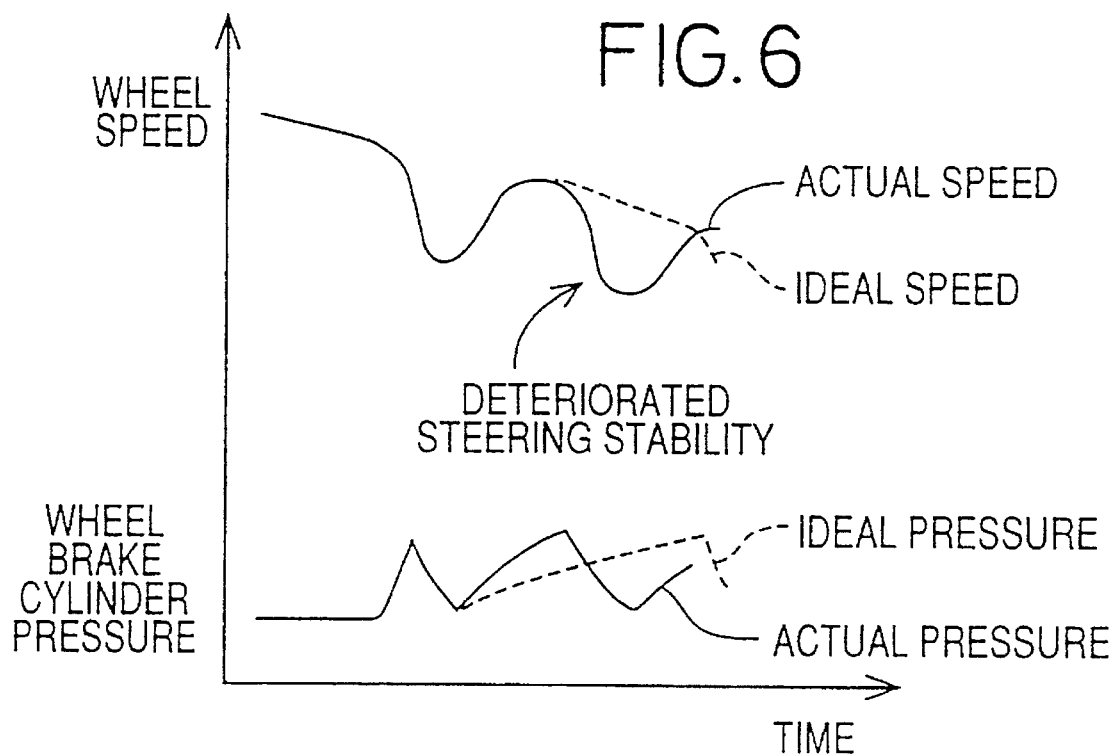
FIG. 6 is a graph explaining a problem experienced by the conventional braking system during running of the vehicle on a road surface having a relatively low friction coefficient.

During an anti-lock pressure control operation during a vehicle run on the low-friction-coefficient road surface, on the other hand, the actual wheel brake cylinder pressure changes as indicated by lower solid line in FIG. 6. That is, the actual wheel brake cylinder pressure during the vehicle run on the low-friction-coefficient road surface is relatively low, and the delivery amount of the pump 150 is relatively large, whereby the rate of increase of the wheel brake cylinder pressure as controlled in the anti-lock manner tends to be high. This causes the actual wheel brake cylinder pressure to be higher than the ideal value as indicated by lower dashed line in FIG. 6. As a result, the wheel tends to have an increased locking tendency and an increased slip ratio, and the actual wheel speed indicated by upper solid line tends to be lower than the ideal value indicated by upper dashed line in FIG. 6. An increase in the slip ratio of the wheel means a decrease in the cornering force of the wheel, which leads to deteriorated steerability or steering stability.

Thus, the vehicle run on a high- or low-friction-coefficient road surface may cause an inadequate rate of increase in the wheel brake cylinder pressure, and resulting deterioration in the braking performance or capability of the braking system. However, the rate of increase of the wheel brake cylinder pressure in the anti-lock control mode may be made inadequate by other causes such as a variation of the voltage of the battery as the DC power source for the motor 152. The electric power to be supplied from the battery to the motor 152 is determined by both the duty ratio D and the battery voltage. Since the duty ratio D is held constant, the power supply to the motor 152 may vary due to a variation in the battery voltage.

While the deterioration of the braking performance of the braking system is caused due to the inadequate rate of increase of the wheel brake cylinder pressure, the braking performance may be deteriorated by an inadequate rate of decrease of the wheel brake cylinder pressure.

Figure 7:
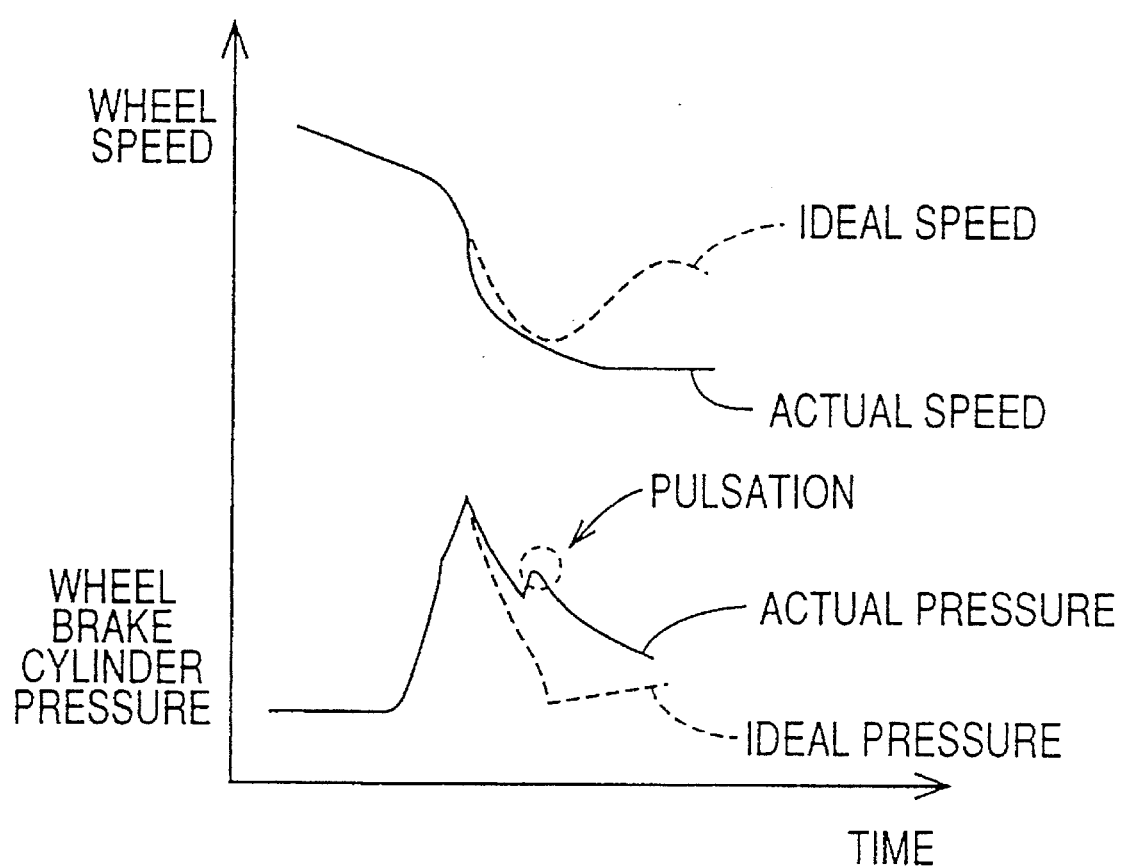
FIG. 7 is a graph explaining a problem experienced by the conventional braking system when a wheel brake cylinder pressure is reduced.

In the present braking system, the second shut-off valve 140 should be opened to reduce both the pressure in the front wheel brake cylinder 22 and the pressure in the rear wheel brake cylinder 26, as is apparent from TABLE 1. Therefore, the pressure of the fluid delivered from the pump 150 is inevitably applied to the front and rear wheel brake cylinders 22, 26, though this pressure application to the cylinders 22, 26 is not necessary. Accordingly, the pressures in the wheel brake cylinders 22, 26 cannot be lowered at a sufficiently high rate. Namely, the actual rate of decrease of the wheel brake cylinder pressure indicated by lower solid line in FIG. 7 is lower than an ideal value indicated by lower dashed line in FIG. 7. This slow decrease of the wheel brake cylinder pressure is serious particularly when the vehicle is running on a low-friction-coefficient road surface. Described in detail, the slow decrease of the wheel brake cylinder pressure results in an excessively high slip ratio of the wheel, and a decrease in the cornering force of the wheel, leading to deteriorated steering stability of the vehicle. Further, the supply of the pressurized fluid delivered from the pump 150 to the wheel brake cylinder 22, 26 during reduction of the wheel brake cylinder pressure will cause a temporary change of the wheel brake cylinder pressure due to pulsation or intermittent delivery of the pump 150, which also cause an inadequate rate of decrease of the wheel brake cylinder pressure.

In view of the above drawbacks, the applicant has developed the present braking system wherein the duty ratio D of the motor 152 for the pump 150 is controlled such that the duty ratio D is higher during a vehicle run on the high-friction-coefficient road surface than during a vehicle run on the low-friction-coefficient road surface, such that the duty ratio D is lower during reduction of the wheel brake cylinder pressure than in the other operating condition of the braking system, and such that the duty ratio D increases with a decrease in the voltage of the battery used for energizing the motor 152.

Figure 8:
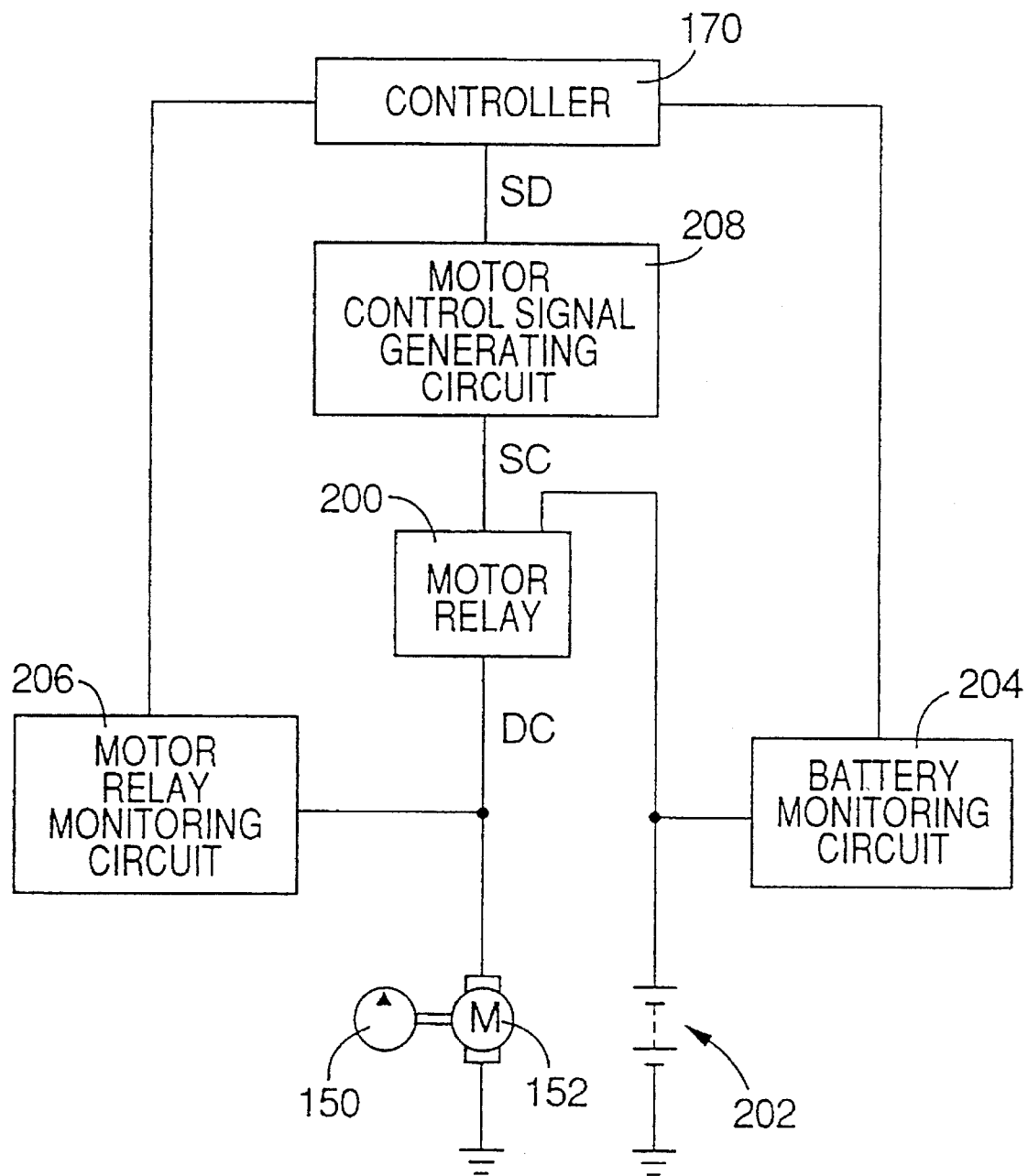
FIG. 8 is a schematic view showing a pump motor 152 used in the braking system of FIG. 1, and a control device for the motor.

That is, the present braking system is provided with a control device as shown in FIG. 8 for controlling the motor 152 for the pump 150. The motor control device of FIG. 8 is one form of a control device for controlling an actuator which is provided to drive the pump 150.

As shown in FIG. 8, the motor 152 mechanically connected to the pump 150 is electrically connected to a battery 202 through a motor relay 200. The motor relay 200 has an input terminal connected to the battery 202, an output terminal connected to the motor 152, and a control terminal connected to a motor control signal generating circuit 208 (which will be described). The motor relay is operable between an ON state and an OFF state, depending upon a signal received at the control terminal. The input and output terminals are connected to each other in the ON state, and are disconnected from each other in the OFF state.

To the battery 202, there is connected a battery monitoring circuit 204 for monitoring a voltage $V_{BAT}$ of the battery 202. The battery monitoring circuit 204 generates a BATTERY VOLTAGE signal indicative of the battery voltage $V_{BAT}$. To the output terminal of the motor relay 200, there is connected a motor relay monitoring circuit 206 for monitoring a voltage at the output terminal. The motor relay monitoring circuit 206 generates a MOTOR VOLTAGE signal indicative of the voltage at the output terminal of the motor relay 200 or a regenerative voltage generated by the motor 152.

The motor control signal generating circuit 208 connected to the control terminal of the motor relay 200 is connected to the controller 170. The controller 170 is adapted to apply a DUTY RATIO signal SD to the motor control signal generating circuit 208. The DUTY RATIO signal SD represents the duty ratio D of the motor 152. The motor control signal generating circuit 208 applies a MOTOR CONTROL signal SC corresponding to the signal SD to the control terminal of the motor relay 200. In response to the MOTOR CONTROL signal SC received from the circuit 208, the motor relay 200 applies a direct current from the battery 202 to the motor 152 so that the motor 152 is alternately turned ON and OFF at the duty ratio D as represented by the MOTOR CONTROL signal SC (DUTY RATIO signal SD).

The ROM of the computer of the controller 170 stores various data tables, and a duty ratio signal generating routine for determining the duty ratio D and generating the DUTY RATIO signal SD. The CPU of the computer executes the duty ratio signal generating routine as illustrated in the flow chart of FIG. 13.

Figure 13:
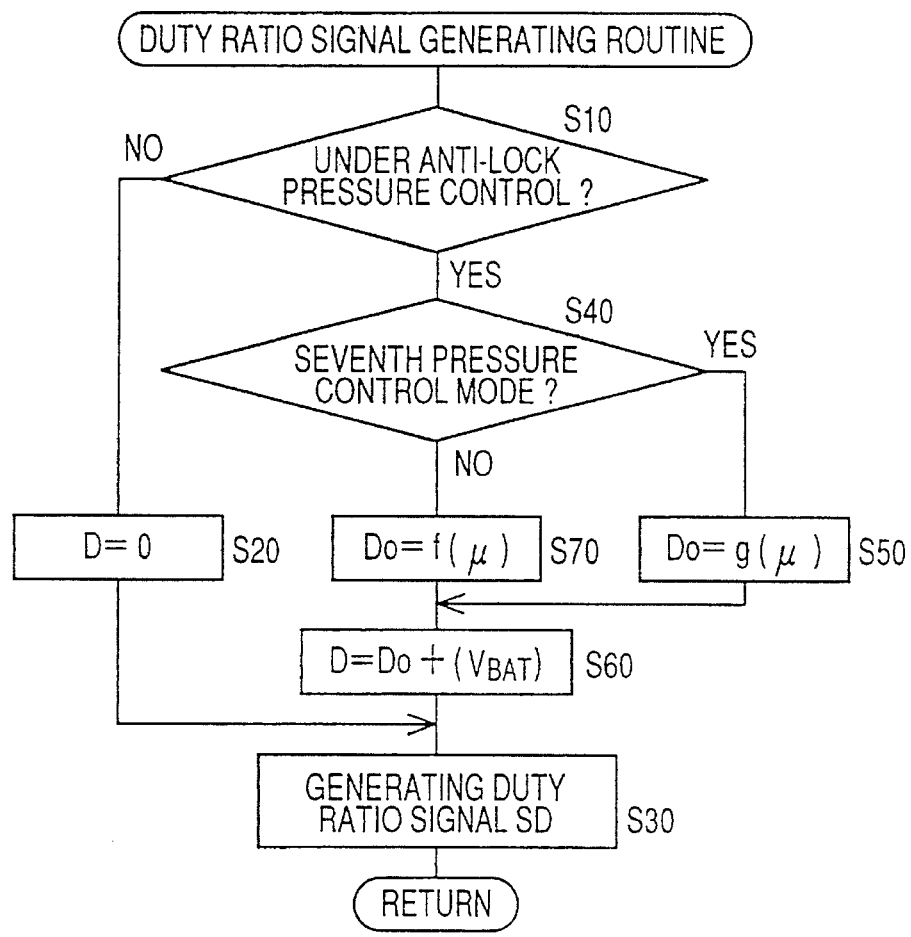
FIG. 13 is a flow chart illustrating a duty ratio signal generating routine executed by the computer for generating a DUTY RATIO signal for controlling the pump motor.

The data tables stored in the ROM include a first μ-Do table, a second μ-Do table, and a $V_{BAT}$-ΔD table, which are used in the routine of FIG. 13. The first μ-Do table is a predetermined relationship between a basic duty ratio Do of the motor 152 and a friction coefficient μ of the road surface. This first μ-Do table or relationship is used in the seventh pressure control mode wherein the pressures in the front and rear wheel brake cylinders 22, 26 are simultaneously reduced. The second μ-Do table is a predetermined relationship between the basic duty ratio Do and the friction coefficient μ, which is used in the other pressure control modes. The $V_{BAT}$-ΔD table is a predetermined relationship between the voltage $V_{BAT}$ of the battery 202 and a compensating value ΔD of the duty ratio D of the motor 152.

Figure 9:
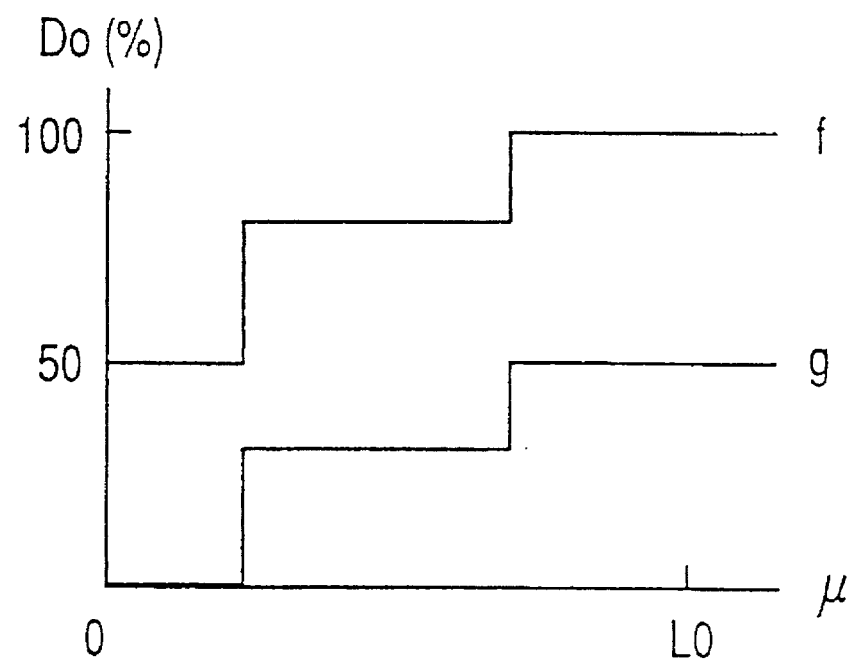
FIG. 9 is a graph indicating predetermined relationships between the friction coefficient μ of a road surface and a basic duty ratio Do of the motor, which relationship is used for controlling the pump motor.

The first μ-Do table or relationship is indicated at "g" in the graph of FIG. 9, while the second μ-Do table or relationship is indicated at "f" in the same graph. It will be understood from this graph that the basic duty ratio Do increases with an increase in the friction coefficient μ of the road surface. Although the present embodiment is adapted such that the basic duty ratio Do changes in three steps, the basic duty ratio Do may change continuously with the friction coefficient μ. It will also be understood that the first and second μ-Do relationships are formulated so that the basic duty ratio Do for a given friction coefficient value μ is lower in the seventh pressure control mode than in the other pressure control modes, in order to optimize the rate of increase of the wheel brake cylinder pressure.

Figure 10:
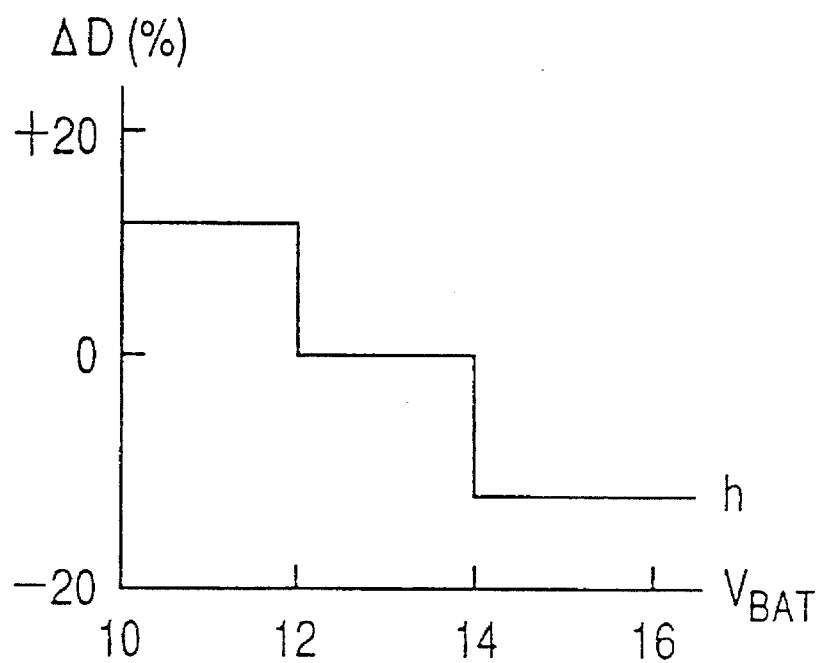
FIG. 10 is a graph indicating a predetermined relationship between a battery voltage $V_{BAT}$ in the motor control device of FIG. 8 and a compensating value ΔD of the duty ratio of the motor, which relationship is also used for controlling the pump motor.

The $V_{BAT}$-ΔD table or relationship is indicated in the graph of FIG. 10. It will be understood from this graph that the compensating value ΔD of the duty ratio D increases with a decrease in the battery voltage $V_{BAT}$. Although the compensating value ΔD changes in three steps in the present embodiment, the compensating value ΔD may change continuously with the battery voltage $V_{BAT}$. The compensating value ΔD is added to the basic duty ratio value Do to obtain a final value $D_{FNL}$ of the duty ratio D. If the compensating value ΔD is positive, the final duty ratio value $D_{FNL}$ is larger than the basic value Do. If the compensating value ΔD is negative, the final duty ratio value $D_{FNL}$ is smaller than the basic value Do.

Figure 11:
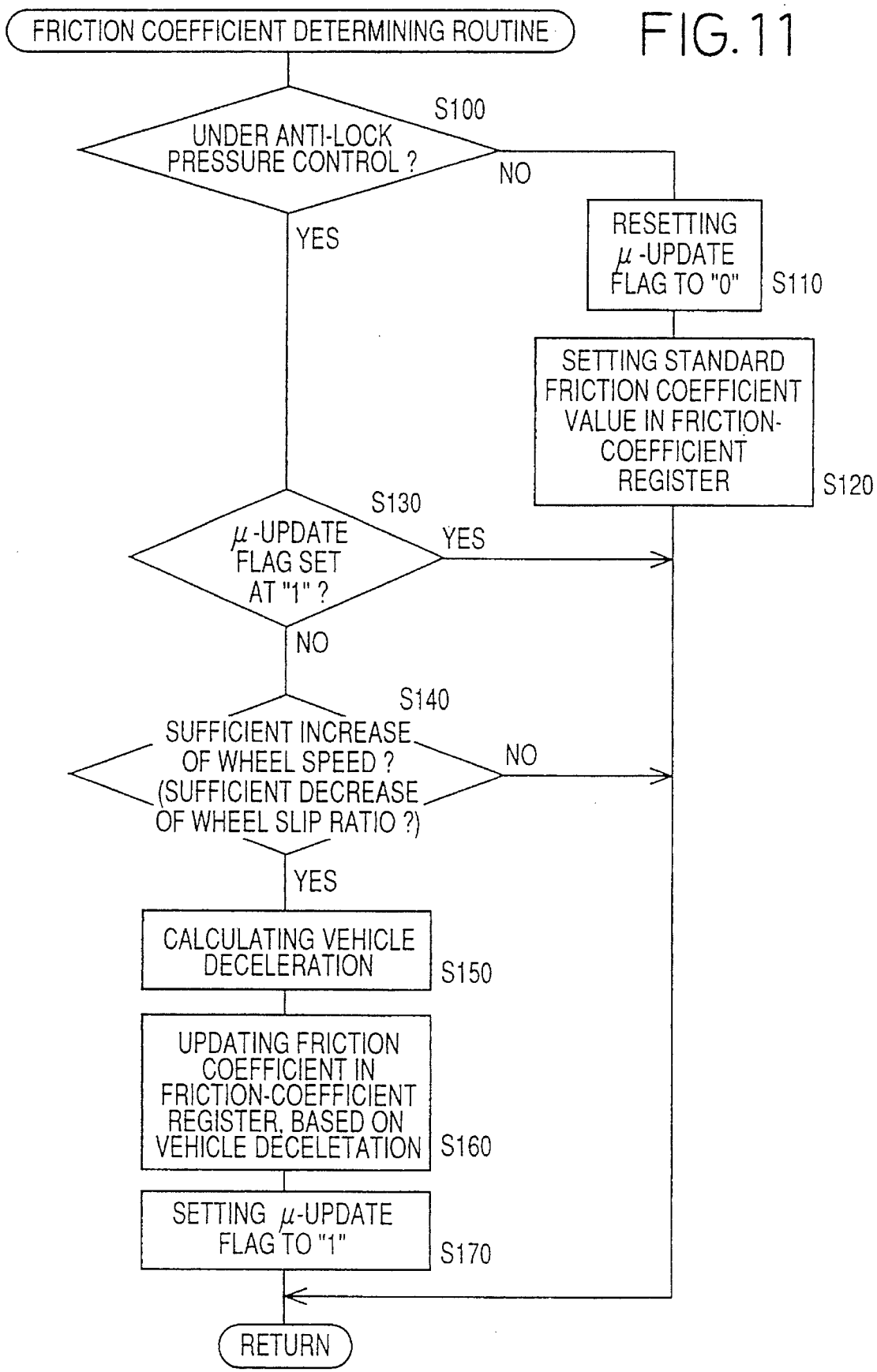
FIG. 11 is a flow chart illustrating a friction coefficient determining routine executed by a computer used in the braking system of FIG. 1, for determining the friction coefficient of a road surface.
Figure 12:
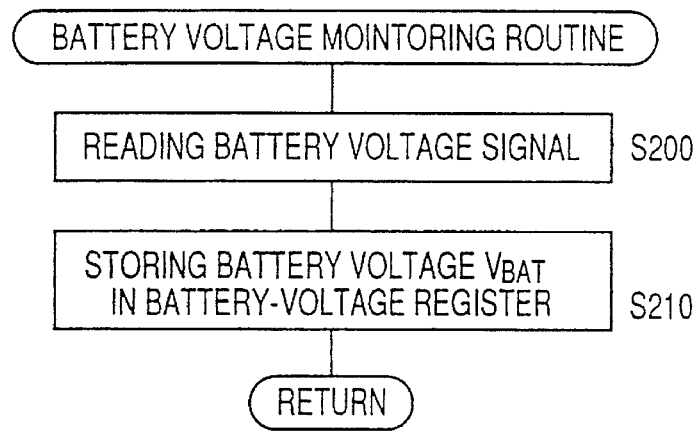
FIG. 12 is a flow chart illustrating a battery voltage monitoring routine executed by the computer for monitoring the voltage of a battery used to operate the pump motor.

The duty ratio signal generating routine of FIG. 13 uses the friction coefficient μ of the road surface determined in a routine illustrated in the flow chart of FIG. 11, and the battery voltage $V_{BAT}$ of the battery 202 determined in a routine illustrated in the flow chart of FIG. 12.

The friction coefficient determining routine of FIG. 11 is formulated to determine the friction coefficient μ of the road surface based on a fact that the actual friction coefficient μ corresponds to the deceleration rate of the wheel or vehicle when the slip ratio of the wheel is held within a predetermined optimum range, that is, when the wheel tire is in gripping or non-slipping contact with the road surface. Therefore, the friction coefficient μ is not determined in an initial anti-lock control period immediately after the initiation of an anti-lock pressure control operation of the braking system, because the accuracy of determination of the friction coefficient μ in the initial anti-lock control period is not accurate enough to assure precise control of the duty ratio D since the wheel deceleration in this initial anti-lock control period does not accurately correspond to the actual friction coefficient μ. The above-indicated initial anti-lock control period ends when the slip ratio of the wheel whose brake cylinder pressure has been controlled in the anti-lock manner is reduced below a predetermined threshold for the first time after the initiation of the anti-lock pressure control operation. For this reason, the friction coefficient determining routine is adapted not to determine the friction coefficient μ in the initial anti-lock control period.

Upon initialization of the computer of the controller 170, a predetermined standard value of the friction coefficient μ is initially set in a friction-coefficient register in the RAM of the computer. This standard value is a relatively small value. The initially set standard value is updated as described below during repeated execution of the routine. Further, the in friction coefficient value stored the friction-coefficient register in the RAM is reset to the standard value each time an anti-lock pressure control operation is terminated. According to this arrangement, the relatively small standard friction coefficient value μ is used immediately after the initiation of an anti-lock pressure control operation, irrespective of the actual friction coefficient μ. Therefore, the relatively high basic duty ratio Do corresponding to the initially set standard friction coefficient μ is used to control the motor 150 with the accordingly high duty ratio D for reducing the pressures in the wheel brake cylinders 22, 26.

Referring to the flow chart of FIG. 11, there will be described in detail the friction coefficient determining routine. This routine is initiated with step S100 to determine whether the braking system is in the process of an anti-lock pressure control operation. If the braking system is not in an anti-lock pressure control operation, that is, if a negative decision (NO) is obtained in step S100, the control flow goes to step S110 to reset an μ-UPDATE flag to "0". This flag is provided in the RAM to assure that the friction coefficient μ in the friction-coefficient register is updated only once for each anti-lock pressure control operation of the braking system. The μ-UPDATE flag is reset to "0" upon initialization of the computer of the controller 170. Therefore, implementation of step S110 for the first time before an anti-lock pressure control operation is not actually necessary. Step S110 is followed by step S120 to provisionally set the above-indicated standard friction coefficient value in the friction-coefficient register. The standard friction coefficient value is that of a low-friction-coefficient road surface. Thus, one cycle of execution of the routine of FIG. 11 is completed, and the control returns to step S100.

If the braking system has started an anti-lock pressure control operation during repeated execution of the routine of FIG. 11, an affirmative decision (YES) is obtained in step S100, and the control flow goes to step S130 to determine whether the μ-UPDATE flag is currently set at "1". Since the μ-UPDATE flag is initially reset to "0", a negative decision (NO) is obtained in step S130, and the control flow goes to step S140 to determine whether the speed of the wheel whose brake cylinder pressure has been reduced in the anti-lock manner has increased to an extent which assures the actual slip ratio of that wheel within a predetermined optimum range. This determination is effected by (a) reading from the RAM the wheel speed values detected in the present and last cycles of execution of the routine, (b) obtaining an acceleration value of the wheel on the basis of a difference between these two wheel speed values, (c) and comparing the obtained wheel acceleration value with a predetermined threshold (positive value). If the obtained wheel acceleration value exceeds the threshold, it means that the wheel speed has increased to a level sufficiently close to the vehicle speed, and that the slip ratio of the wheel is held within the predetermined optimum range. Immediately after the initiation of the anti-lock pressure control operation, a negative decision (NO) is obtained in step S140, and one cycle of execution of the routine is completed. In this case, the standard friction coefficient value remains in the friction-coefficient register in the RAM.

If the wheel speed has increased, during the repeated execution of the routine, to a level at which the slip ratio of the wheel is within the optimum range, an affirmative decision (YES) is obtained in step S140, and the control flow goes to step S150 to calculate a deceleration value of the vehicle. This calculation is effected by (a) reading from the RAM the vehicle speed values estimated in the present and last cycles of execution of the routine, and (b) obtaining the vehicle deceleration value on the basis of a difference between these two estimated vehicle speed values. Then, step S160 is implemented to estimate the actual friction coefficient μ of the road surface on which the vehicle is running. This estimation is effected on the basis of the calculated vehicle deceleration, and according to a predetermined relationship between the vehicle deceleration value and the friction coefficient μ, which relationship is stored as a data table in the ROM of the computer. The friction coefficient value in the friction-coefficient register in the RAM is updated to the estimated friction coefficient value, also in Step S160. Then, the control flow goes to step S170 to set the μ-UPDATE flag to "1".

In the next cycle of execution of the routine of the friction-coefficient determining routine of FIG. 11, an affirmative decision (YES) is obtained in step S130 since the μ-UPDATE flag was set to "1" in step S170 in the last cycle. Consequently, one cycle of execution of the routine is terminated with the steps S140–S170 being skipped. It will therefore be understood that the friction coefficient value in the friction-coefficient register is updated only once for each anti-lock pressure control operation, when the speed of the wheel in question has increased for the first time to a level close to the vehicle speed. The thus updated friction coefficient value is maintained until it is updated in step S160 during a next anti-lock pressure control operation. When the anti-lock pressure control operation is terminated, the negative decision (NO) is obtained in step S100, and the control flow goes to step Sl10 to reset the μ-UPDATE flag to "0", and step S120 to reset the friction coefficient value in the friction-coefficient register to the standard value, so that the standard friction coefficient value is used until it is updated in step S160 in the next anti-lock pressure control operation.

Referring next to the flow chart of FIG. 12, the battery monitoring routine will be described. This battery voltage monitoring routine is initiated with step S200 to read the BATTERY VOLTAGE signal received from the battery monitoring circuit 204. Then, step S210 is implemented to determine the battery voltage $V_{BAT}$ on the basis of the BATTERY VOLTAGE signal, and store the battery voltage $V_{BAT}$ in a battery-voltage register in the RAM. The battery voltage monitoring routine is repeatedly executed.

The duty ratio signal generating routine of FIG. 13 is initiated with step S10 to determine whether the braking system is in the process of an anti-lock pressure control operation. If a negative decision (NO) is obtained in step S10, the control flow goes to step S20 in which the duty ratio D is set to "0". Step S20 is followed by step S30 in which the DUTY RATIO signal D indicative of the duty ratio D=0 is applied to the motor control signal generating circuit 208, and the MOTOR CONTROL signal SC corresponding to the DUTY RATIO signal D is applied from the circuit 208 to the motor relay 200. In this case where the duty ratio D is zero, no direct current is supplied from the battery 202 to the motor 152 through the motor relay 200. In other words, the motor 152 is held off during the entire period of the duty cycle. That is, the motor 152 is not operated. One cycle of execution of the routine is terminated with step S30.

If the braking system is presently operating in the anti-lock control manner, namely, if an affirmative decision (YES) is obtained in step S10, the control flow goes to step S40 to determine whether the braking system is placed in the seventh pressure control mode in which the pressures in the front and rear wheel brake cylinders 22, 26 are both reduced. If an affirmative decision (YES) is obtained in step S40, the control flow goes to step S50 to read the friction coefficient value µ from the friction-coefficient register in the RAM, and determine the basic duty ratio Do on the basis of the friction coefficient value µ and according to the first µ-Do relationship used in the seventh pressure control mode. Thus, the basic duty ratio Do which corresponds to the friction coefficient value µ currently stored in the friction-coefficient register is determined as Do=g(µ).

Step S50 is followed by step S60 to read the battery voltage $V_{BAT}$ from the battery-voltage register in the RAM, and determine the compensating value ΔD of the duty ratio D on the basis of the battery voltage $V_{BAT}$ and according to the $V_{BAT}$-ΔD relationship. Thus, the compensating value ΔD which corresponds to the battery voltage $V_{BAT}$ currently stored in the battery-voltage register is determined as ΔD=h($V_{BAT}$). Then, a sum of the thus determined basic duty ratio Do and compensating value ΔD=h($V_{BAT}$) is determined as the duty ratio D of the motor 152. Step S60 is followed by step S30 in which the DUTY RATIO signal SD indicative of the duty ratio D determined in step S60 is applied to the motor control signal generating circuit 208 so that the corresponding MOTOR CONTROL signal SC is applied to the motor relay 200 to operate the motor 152 at the determined duty ratio D.

If the braking system is not placed in the seventh pressure control mode, that is, if a negative decision (NO) is obtained in step S40, the control flow goes to step S70 to read the friction coefficient value µ from the friction-coefficient register and determine the basic duty ratio Do on the basis of the friction coefficient value µ and according to the second µ-Do relationship. Thus, the basic duty ratio Do which corresponds to the friction coefficient value µ currently stored in the friction-coefficient register is determined as Do=f(µ).

Step S70 is followed by step S60 in which the compensating value ΔD corresponding to the battery voltage $V_{BAT}$ is determined as ΔD=h($V_{BAT}$) as described above, and a sum of the basic duty ratio Do determined in step S70 and the compensating value h($V_{BAT}$) is determined as the duty ratio D. In this case, too, step S60 is followed by step S30 in which the DUTY RATIO signal SD is applied to the motor control signal generating circuit 208.

Figure 14:
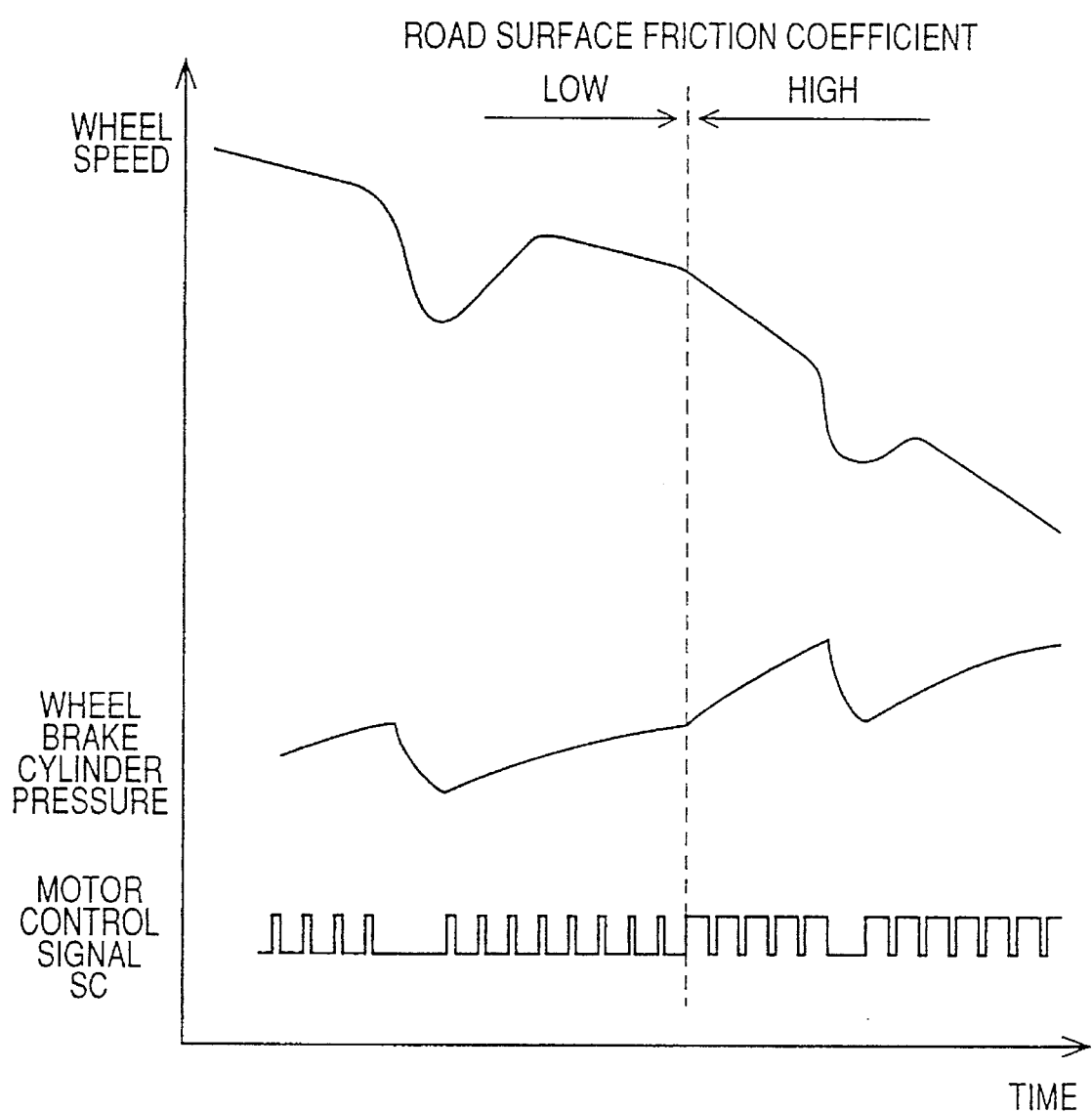
FIG. 14 is a graph indicating an example of changes in wheel brake cylinder pressure and motor control signal in the motor control device during running of a motor vehicle on high-friction-coefficient and low-friction-coefficient road surfaces.

In the anti-lock pressure control operation, therefore, the pulse width of the MOTOR CONTROL signal SC applied to the motor relay 200 is made larger with the relatively high duty ratio D of the motor 152 during a vehicle run on a high-friction-coefficient road surface, than during a vehicle run on a low-friction-coefficient road surface, as indicated in the graph of FIG. 14. Accordingly, the amount of delivery of the pump 150 is made larger so as to prevent or restrict a low rate of increase of the pressure in the front and rear wheel brake cylinders 22, 26 while the vehicle is running on the high-friction-coefficient road surface. That is, the present arrangement assures a sufficiently high rate of increase of the wheel brake cylinder pressure, along a line close to the ideal line as indicated by the lower dashed line in FIG. 5.

Further, the present embodiment is adapted to shorten the pulse width of the MOTOR CONTROL signal SC with the relatively low duty ratio D while the braking system is placed in the seventh pressure control mode (in which the pressures in the wheel brake cylinders 22, 26 are being reduced), than while the braking system is placed in the other pressure control modes (e.g., pressure increase mode). Accordingly, the amount of delivery of the pump 150 is made smaller so as to prevent or restrict a low rate of decrease of the wheel brake cylinder pressure and a temporary change of the wheel brake cylinder pressure due to intermittent delivery of the pump 150 while the wheel brake cylinder pressure is being reduced. The present arrangement assures a sufficiently high rate of decrease of the wheel brake cylinder pressure, along a line close to the ideal line as indicated by the lower dashed line in FIG. 7.

Figure 15:
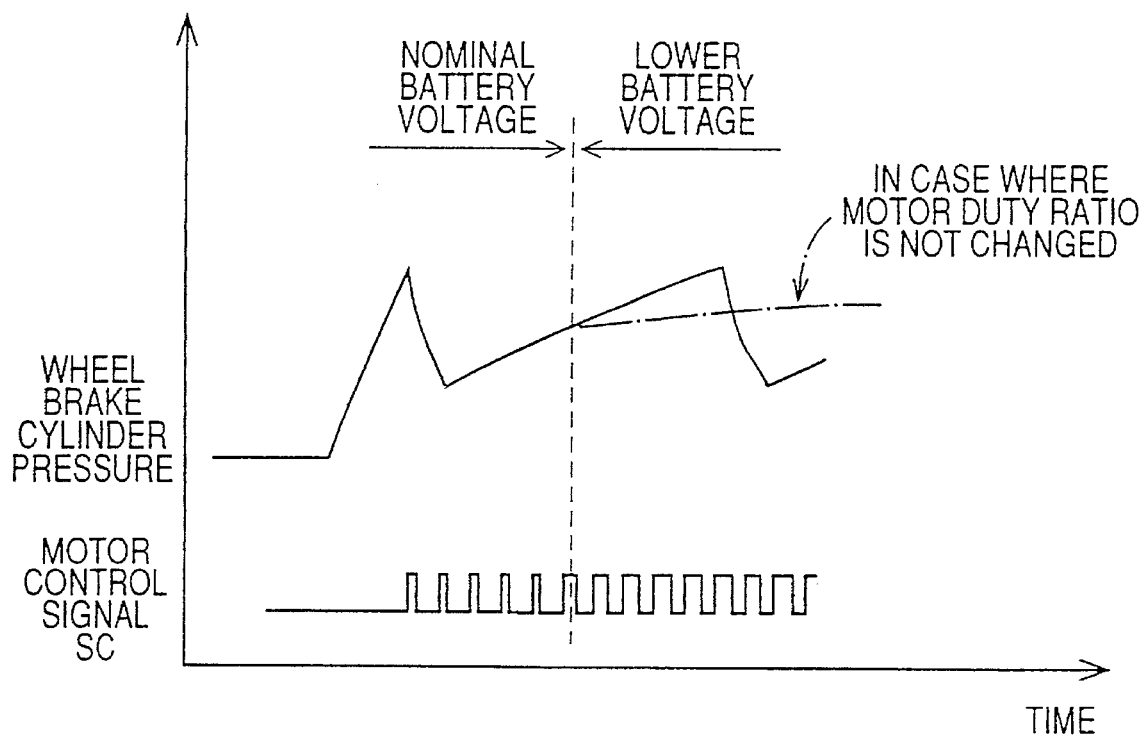
FIG. 15 is a graph indicating an example of changes in the wheel brake cylinder pressure and the motor control signal when the battery has a nominal voltage and when the battery voltage is lower than the nominal voltage.

The present braking system is further adapted so that the pulse width of the MOTOR CONTROL signal SC during an anti-lock pressure control operation is made larger with the relatively high duty ratio D when the voltage $V_{BAT}$ of the battery 202 is lower than the nominal voltage than when the battery voltage $V_{BAT}$ is equal to the nominal voltage, as indicated in the graph of FIG. 15. This arrangement is effective to prevent or restrict a decrease of the delivery amount of the pump 150 and a consequent decrease of the rate of increase of the wheel brake cylinder pressure, which would occur due to a drop of the battery voltage $V_{BAT}$ below the nominal level.

The controller 170 has an initial diagnostic function to check the motor 152, motor relay 200 and other electrical components. The initial diagnosis for the motor 152 includes a step of determining whether the motor 152 fails to operate or rotate, while the initial diagnosis for the motor relay 200 includes a step of determining the presence of electrical disconnection or discontinuity of the motor relay 200. The diagnosis of the motor relay 200 for the electrical disconnection is effected prior to the diagnosis for the motor 152. The diagnosis for the electrical disconnection of the motor relay 200 is effected by turning ON the motor relay 200 at its control terminal, and determining whether the output voltage at the output terminal of the motor relay 200 as detected by the motor relay monitoring circuit 206 is higher than a predetermined reference voltage. If the detected output voltage is higher than the reference voltage, it means that the motor relay 200 does not suffer from electrical disconnection. The diagnosis of the motor 152 for failure to operate is effected based on a fact that even after the motor 152 is turned off or deenergized, the motor 152 continues to rotate due to an inertia and the coil of the motor 152 generates a regenerative voltage, if the motor 152 is normally functioning. As described above, the motor relay 200 is turned on for diagnosing the motor relay 200 for electrical disconnection. Thus, the motor 152 is turned on for diagnosing the motor relay 200. The diagnosis of the motor relay 200 is terminated by turning off the motor relay 200, namely, by turning off the motor 152. Then, the diagnosis of the motor 152 is effected by determining whether the regenerative voltage generated after the motor 152 is turned off is higher than a predetermined reference voltage. If the regenerative voltage is higher than the reference voltage, it means that the motor 152 is normal.

Figure 16:
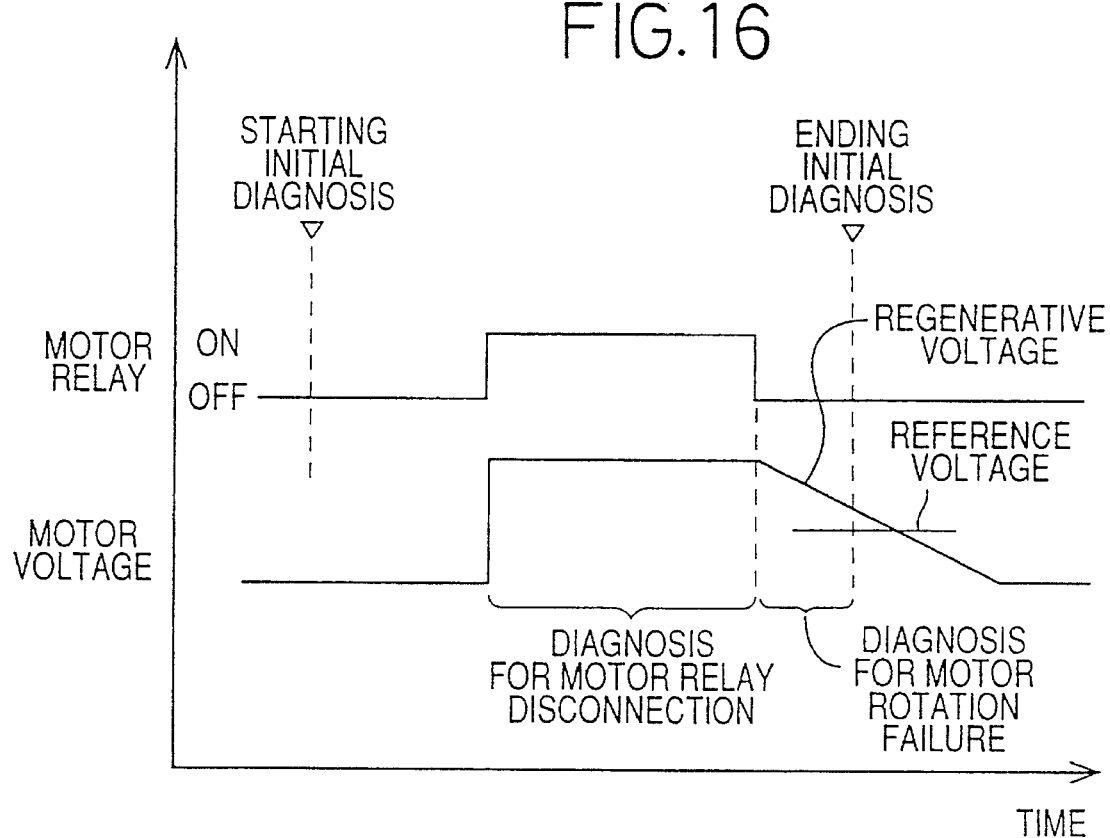
FIG. 16 is a time chart illustrating a diagnosis effected in a conventional braking system to detect electrical disconnection of a motor relay and an operating failure of the motor.

Conventionally, the diagnosis of the motor relay 200 for electrical disconnection is effected by holding on the control terminal of the motor relay 200 for a predetermined time, as indicated in the graph of FIG. 16, and determining whether the output voltage of the motor relay 200 as detected by the motor monitoring circuit 206 is higher than the reference voltage. If the motor relay 200 and motor 152 are both normally functioning, the motor 152 is kept operated during the period of the diagnosis of the motor relay 200, and the operating speeds of the motor 152 and pump 150 tend to be higher than required for the diagnosis of the motor 152, in an initial period of the diagnosis of the motor 152. This causes a considerably large noise generated by the pump 150 and motor 152.

In view of the conventionally encountered drawback described above, the diagnosis is achieved by alternately turning on and off the motor 152 by intermittent application of a direct current at a predetermined duty ratio $D_{INT}$ selected between 0% and 100%, as in an anti-lock pressure control operation described above. The intermittent application of the DC current to the motor 152 results in a smaller amount of overall electric power supplied to the motor, than in the conventional arrangement wherein the motor 152 is kept operated during the diagnosis of the motor relay 200.

The duty ratio $D_{INT}$ of the motor 152 used in the initial diagnosis of the braking system is determined so that the regenerative voltage necessarily exceeds the reference voltage as long as the motor 152 is normal. Further, the on time of each duty cycle is determined to be long enough to permit the motor relay monitoring circuit 206 to be highly responsive to a change in the output voltage at the output terminal of the motor relay 200. Thus, the on time is determined with the sensitivity of the circuit 206 taken into account. The duty ratio $D_{INT}$ is made as low as possible to minimize the overall electric power supply to the motor 152 for the initial diagnosis, but permits normal diagnosis of the motor relay 200 and motor 152.

Figure 17:
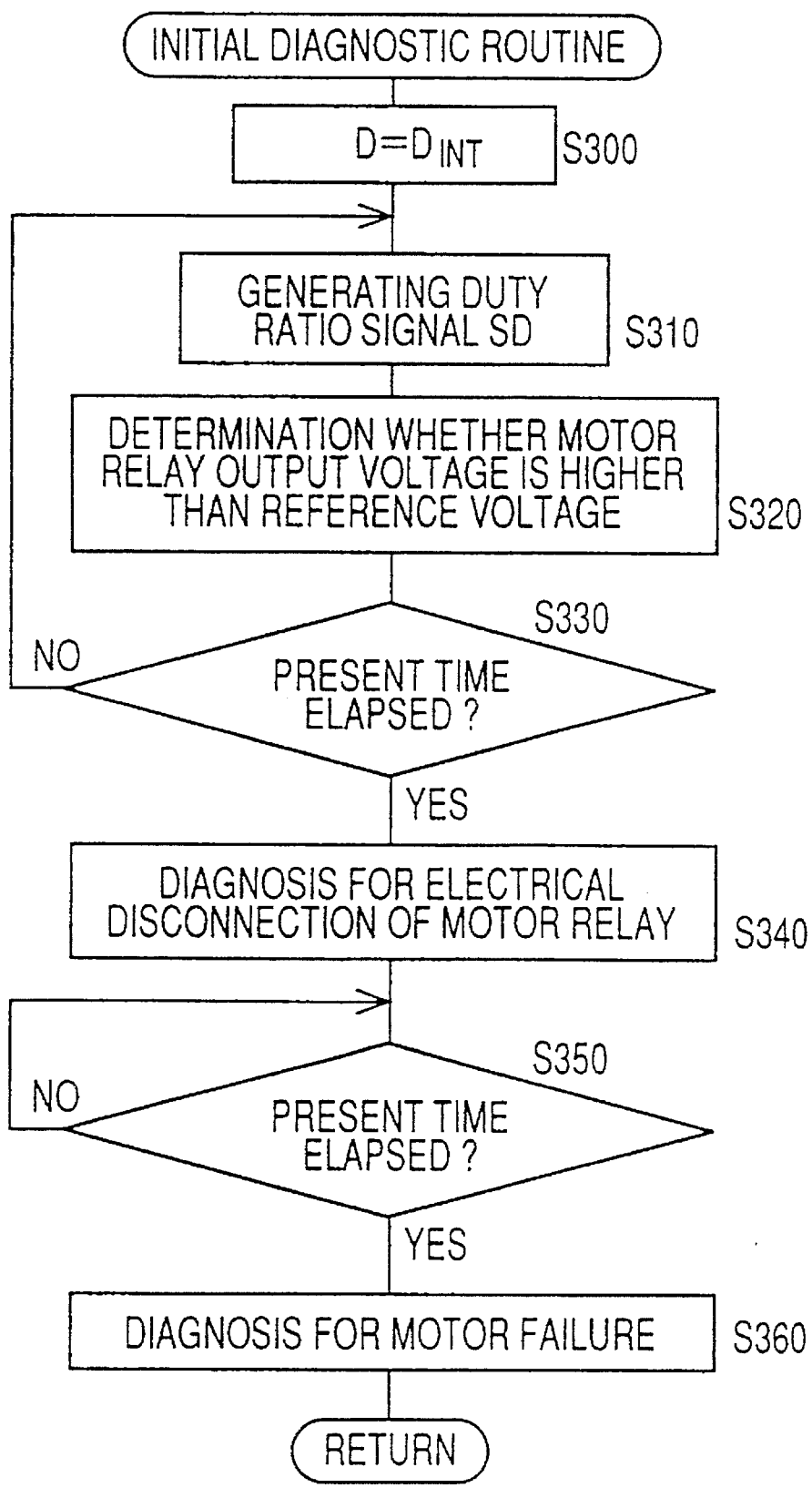
FIG. 17 is a flow chart illustrating an initial diagnostic routine executed by the computer used in the embodiment of FIG. 1.

Referring to the flow chart of FIG. 17, there will be described in detail an initial diagnostic routine executed by the computer of the controller 170 to diagnose the motor relay 200 and motor 152. The initial diagnostic routine of FIG. 17 is stored in the ROM of the computer.

The initial diagnostic routine is initiated with step S300 in which the duty ratio D of the motor 152 is set to the predetermined value $D_{INT}$ (between 0% and 100%) described above, which is stored in the ROM.

Step S300 is followed by step S310 in which the DUTY RATIO signal SD corresponding to the duty ratio $D_{INT}$ is applied to the motor control signal generating circuit 208, and the corresponding MOTOR CONTROL signal SC is applied to the control terminal of the motor relay 200. Then, the control flow goes to step S320 to make a determination as to whether the output voltage of the motor relay 200 as represented by the MOTOR VOLTAGE signal received from the motor relay monitoring circuit 206 is higher than the reference voltage. Steps S310 and S320 are repeatedly implemented until an affirmative decision (YES) is obtained in the next step S330, that is, until a preset time has elapsed after the first implementation of step S310. When the affirmative decision (YES) is obtained in step S330, the control flow goes to step S340 to diagnose the motor relay 200 for electrical disconnection, by determining whether the number of the affirmative determinations in step S320 that the output voltage detected by the motor relay monitoring circuit 206 is larger than a predetermined value. If this number is larger than the predetermined value, it means that the motor relay 200 does not suffer from electrical disconnection.

Step S340 is followed by step S350 to determine whether a preset time has elapsed after the affirmative decision (YES) is obtained in step S330. If an affirmative decision (YES) is obtained in step S350, the control flow goes to step S360 to diagnose the motor 152 by determining whether the regenerative voltage detected by the circuit 206 with the motor relay 200 held off is higher than the reference voltage. If the regenerative voltage is higher than the reference voltage, it means that the motor 152 rotated during the diagnosis of the motor relay 200, and therefore the motor 152 is normal.

Figure 18:
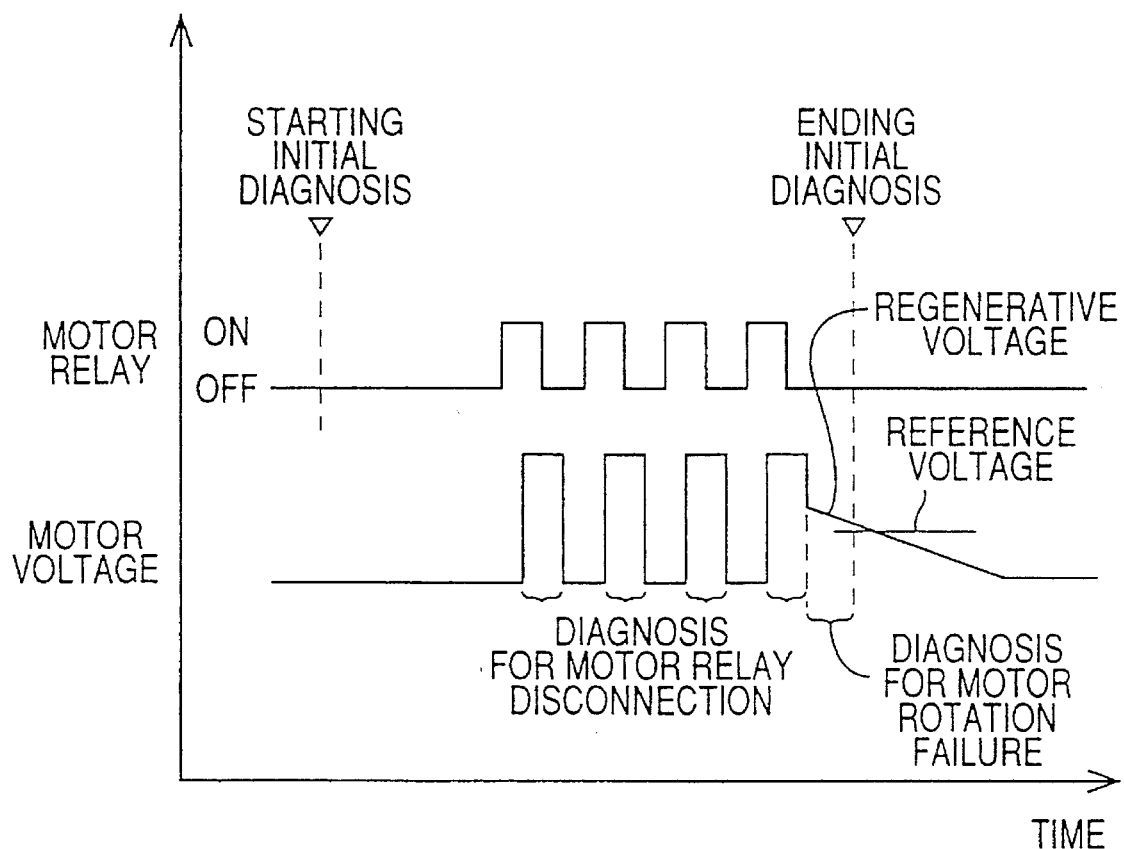
FIG. 18 is a time chart illustrating a diagnosis effected in the embodiment of FIG. 1, which diagnosis corresponds to that of FIG. 16.

As described above, the motor relay 200 is alternately turned on and off for a predetermined time, according to the MOTOR CONTROL signal SC corresponding to the DUTY RATIO signal SD indicative of the predetermined duty ratio $D_{INT}$, as indicated in the graph of FIG. 18, for diagnosing the motor relay 200 for electrical disconnection. The number of the affirmative determinations in step S320 that the voltage represented by the MOTOR VOLTAGE signal generated by the circuit 206 is higher than the reference voltage is compared in step S340 with the predetermined value to determine whether the motor relay 200 suffers from electrical disconnection. That is, if the number of the affirmative determinations in step S320 during the predetermined time (step S330) is larger than the predetermined value, it means that the motor relay 200 is free from electrical disconnection. After the diagnosis of the motor relay 200, the motor relay 200 is held off at its control terminal (with the duty ratio D being zero). When a preset time has passed after the motor relay 200 is turned off last or after the affirmative decision is obtained in step S330), a decision is made as to whether the regenerative voltage as detected by the motor relay monitoring circuit 206 is higher than the predetermined reference voltage. The affirmative decision means that the motor 152 is now rotating due to an inertia, and therefore means that the motor 152 did rotate during the diagnosis of the motor relay 200. Thus, the motor 152 can be diagnosed on the basis of the regenerative voltage after the motor relay 200 is turned off.

It will be understood from the foregoing description that the first, second and third shut-off valves 100, 140, 146 constitute an electrically operated pressure control device, while the motor relay 200 and motor control signal generating circuit 208 constitute a power supply portion of a pump actuator control device for controlling a pump actuator in the form of the motor 152 for operating the pump 150. This power supply portion is adapted to supply electric power from a DC power source in the form of the battery 202 to the pump actuator 152. It will also be understood that the battery monitoring circuit 204 and portions of the controller 170 assigned to execute the battery voltage monitoring routine of FIG. 12 and the duty ratio signal generating routine of FIG. 13 constitute a signal generating portion of the pump actuator control device. This signal generating portion is adapted to generate a duty ratio signal which controls the power supply portion. The battery monitoring circuit 204 and the portion of the controller 170 assigned to execute the routine of FIG. 12 and step S60 of the routine of FIG. 13 constitute a first signal determining means of the signal generating portion, which is adapted to determine the duty ratio signal depending upon an output state of the DC power source 202. The battery monitoring circuit 204 constitutes detecting means for detecting an output of the battery 202. The portion of the controller 170 assigned to execute steps S40, S50 and S70 of the routine of FIG. 13 constitutes a second signal determining means of the signal generating portion, which is adapted to determine the duty ratio signal depending upon a currently selected one of the operating states of the electrically operated pressure control device. The portion of the controller 170 assigned to execute step S40 of the routine of FIG. 13 constitutes detecting means for determining whether the electrically operated pressure control device is placed in the pressure-decrease state (seventh pressure control mode). The first and second signal determining means indicated above constitute optimizing means responsive to the detecting means, for optimizing the rate of change of the fluid pressure in the wheel brake cylinder. Further, the portion of the controller 170 assigned to execute the routine of FIG. 11 and steps S50 and S70 of the routine of FIG. 13 constitutes a third signal determining portion of the signal generating portion, which is adapted to determine the duty ratio signal depending upon the friction coefficient of a road surface on which the vehicle is running. It is also noted that the motor control signal generating circuit 208, motor relay monitoring circuit 206 and a portion of the controller 170 assigned to execute the initial diagnostic routine of FIG. 17 constitute a diagnosing device for diagnosing the motor 152.

While the present invention has been described in detail in its presently preferred embodiment, for illustrative purpose only, it is to be understood that the present invention is not limited to the details of the illustrated embodiment, but may be embodied with various changes, modifications and improvements, which may occur to those skilled in the art, without departing from the spirit and scope of the invention defined in the following claims.

What is claimed is:

1. A braking system for a motor vehicle, comprising:

an operator-controlled brake operating member;

a master cylinder for generating a fluid pressure according to an amount of operation of said brake operating member;

a wheel brake cylinder for operating a wheel brake to brake a wheel of the motor vehicle according to a fluid pressure applied to said wheel brake cylinder;

a reservoir for storing a working fluid;

a pump for pressurizing the fluid sucked up from said reservoir, and delivering the pressurized fluid toward at least one of said master cylinder and said wheel brake cylinder;

a DC power source;

a pump actuator driven by said DC power source to operate said pump;

an electrically operated pressure control device having a plurality of operating states which are selectively established to electrically control the fluid pressure in the wheel brake cylinder and which include a pressure-increase state for substantial fluid communication of the wheel brake cylinder with at least one of the master cylinder and a deliver side of the pump, and a pressure-decrease state for substantial fluid communication of the wheel brake cylinder with the reservoir;

a pump actuator control device having a power supply portion for intermittently supplying electric power from said DC power source to said pump actuator such that a duty ratio of the pump actuator is controlled in response to a duty ratio signal, and a signal generating portion for generating said duty ratio signal; and said signal generating portion of said pump actuator control device comprising monitoring means for detecting at least one of a physical value which influences an amount of delivery of said pressurized fluid from said pump, and a selected one of said operating states of said electrically operated pressure control device, and optimizing means responsive to said monitoring means, for optimizing a rate of change of the fluid pressure in said wheel brake cylinder during an operation of said electrically operated pressure control device.

2. A braking system according to claim 1, wherein said pressurized fluid is delivered from said pump toward said wheel brake cylinder, and said wheel brake cylinder is held in substantial fluid communication with said pump when said pressure control device is placed in said pressure-increase state, said monitoring means including output detecting means for detecting as said physical value an output of said DC power source, and said optimizing means including first signal determining means for determining said duty ratio signal depending upon said output of said DC power source detected by said output detecting means.

3. A braking system according to claim 2, wherein said output detecting means detects a voltage of said DC power source, and said first signal determining means determines said duty ratio signal so as to increase said duty ratio of said pump actuator with a decrease of said voltage, to thereby increase an amount of delivery of said pressurized fluid from said pump with the decrease of said voltage.

4. A braking system according to claim 3, wherein said first signal determining means includes a controller for generating said duty ratio signal indicative of said duty ratio, said duty ratio being equal to a ratio of an on-time of said duty ratio signal to a duty cycle period of said duty ratio signal, said controller determining said duty ratio signal so as to increase said duty ratio with the decrease of said voltage, said power supply portion including an actuator control signal generating circuit for applying to said pump actuator an actuator control signal which corresponds to said duty ratio signal.

5. A braking system according to claim 1, wherein said pressurized fluid is delivered from said pump toward said wheel brake cylinder, and said wheel brake cylinder is held in substantial fluid communication with said pump when said pressure control device is placed in said pressure-increase state, and in substantial fluid communication with said reservoir and said pump when said pressure control device is placed in said pressure-decrease state, said monitoring means including state detecting means for determining whether said electrically operated pressure control device is placed in said pressure-decrease state, said optimizing means including second signal determining means for determining said duty ratio signal such that said duty ratio of said pump actuator is lower when said pressure control device is placed in said pressure-decrease state than when said pressure control device is placed in the other of said operating states, so that an amount of delivery of said pressurized fluid from said pump is smaller in said pressure-decrease state than in said other of the operating states.

6. A braking system according to claim 5, wherein said second signal determining means includes a controller for generating said duty ratio signal indicative of said duty ratio, said duty ratio being equal to a ratio of an on-time of said duty ratio signal to a duty cycle period of said duty ratio signal, said controller determining said duty ratio signal so that said duty ratio is lower when said pressure control device is placed in said pressure-decrease position than in said other of said operating states, said power supply portion including an actuator control signal generating circuit for applying to said pump actuator an actuator control signal which corresponds to said duty ratio signal.

7. A braking system according to claim 1, wherein said signal generating portion of said pump actuator control device further comprises third signal determining means for determining said duty ratio signal depending upon a friction coefficient of a road surface on which said motor vehicle is running.

8. A braking system according to claim 7, wherein said signal generating portion further comprises friction-coefficient determining means for determining said friction coefficient, and said third signal determining means determines said duty ratio signal such that said duty ratio of said pump actuator increases with an increase of said friction coefficient determined by said friction-coefficient determining means, to thereby increase an amount of delivery of said pressurized fluid from said pump.

9. A brake system according to claim 1, further comprising a diagnostic device for diagnosing an electric motor as said pump actuator by intermittently supplying electric power from said DC power source to said electric motor such that said motor is alternately turned on and off for a predetermined length of time consisting of alternate on-times and off-times each of which is larger than zero.

10. A braking system according to claim 1, which is an X-crossing type braking system for a four-wheel motor vehicle including a front right, a front left, a rear right and rear left wheel, said X-crossing type braking system having two pressure application sub-systems which are connected to respective two mutually independent pressurizing chambers of said master cylinder, each of said two pressure application sub-systems including (a) a front brake cylinder passage connecting a corresponding one of said two pressurizing chambers of the master cylinder and a front wheel brake cylinder for braking a corresponding one of said front right and left wheels, (b) a rear brake cylinder passage connecting said front brake cylinder passage and a rear wheel brake cylinder for braking a corresponding one of said rear right and left wheels, (c) a first solenoid-operated shut-off valve which is disposed in a portion of said front brake cylinder passage between said master cylinder and a point of connection of said front and rear brake cylinder passages, said first solenoid-operated shut-off valve being open and closed respectively in a normal braking mode and an anti-lock braking mode of said front and rear wheel brake cylinders, (d) a normally-open second solenoid-operated shut-off valve disposed in the rear brake cylinder passage, (e) a reservoir passage connected at one of opposite ends thereof to a portion of said rear brake cylinder passage between said second solenoid-operated shut-off valve and said rear wheel brake cylinder, (f) a normally-closed third solenoid-operated shut-off valve disposed in said reservoir passage, (g) a pump passage connected at one of opposite ends thereof to said reservoir and at the other end thereof to a portion of the rear brake cylinder passage between the second solenoid-operated shut-off valve and said point of connection, said pump being disposed in said pump passage, (h) a controller for controlling said first, second and third solenoid-operated shut-off valves for controlling the fluid pressures in said front and rear wheel brake cylinders in said anti-lock braking mode, and (i) a pressure reducing valve device provided in each of said two pressure application sub-systems and disposed between said pump and said front wheel brake cylinder, for reducing the pressure of said pressurized fluid delivered from said pump and applying the reduced pressure to said front wheel brake cylinder.

11. A braking system according to claim 10, wherein said pressure reducing valve device includes a check valve for permitting a flow of the fluid in a first direction from said pump toward said front wheel brake cylinder when a pressure on one of opposite sides of said check valve nearer to said pump is higher than a pressure on the other of said opposite sides nearer to said front wheel brake cylinder by more than a predetermined amount which is not zero, said check valve inhibiting a flow of the fluid in a second direction opposite to said first direction.

12. A braking system for a motor vehicle, comprising:

an operator-controlled brake operating member;

a master cylinder for generating a fluid pressure according to an amount of operation of said brake operating member;

a wheel brake cylinder for operating a wheel brake to brake a wheel of the motor vehicle according to a fluid pressure applied to said wheel brake cylinder;

a reservoir for storing a working fluid;

a pump for pressurizing the fluid sucked up from said reservoir, and delivering the pressurized fluid toward at least one of said master cylinder and said wheel brake cylinder;

a DC power source;

an electric motor driven by said DC power source to operate said pump;

an electrically operated pressure control device having a plurality of operating states which are selectively established to electrically control the fluid pressure in the wheel brake cylinder and which include a pressure-increase state for substantial fluid communication of the wheel brake cylinder with at least one of the master cylinder and the pump, and a pressure-decrease state for substantial fluid communication of the wheel brake cylinder with the reservoir;

a diagnostic device for diagnosing said electric motor by supplying electric power from said DC power source to said electric motor; and said diagnostic device intermittently supplying the electric power from said DC power source to said electric motor such that said motor is alternately turned on and off for a predetermined length of time consisting of alternate on-times and off-times each of which is larger than zero.

13. A braking system according to claim 12, further comprising a motor control device having a power supply portion for supplying electric power from said DC power source to said motor during an operation of said electrically operated pressure control device and during an operation of said diagnostic device, and wherein said diagnostic device includes first diagnosing means for diagnosing said power supply portion to detect electrical disconnection of said power supply portion, and second diagnosing means operated after an operation of said first diagnosing means, for diagnosing said electric motor to detect a failure of said electric motor to normally operate when said power supply portion is commanded to supply the electric power to said electric motor, said first diagnosing means commanding said power supply portion to intermittently supply the electric power to said DC power source to said electric motor, said second diagnosing means commanding said power supply portion to stop a supply of the electric power to said electric motor.

14. A braking system according to claim 13, wherein said first diagnosing means includes a voltage monitoring circuit for detecting an output voltage which is applied from said power supply portion to said electric motor when said power supply portion is commanded by said first diagnosing means to supply the electric power to said electric motor, said first diagnosing means determines a presence of said electrical disconnection of said power supply portion if said output voltage detected by said voltage monitoring means is lower than a predetermined reference voltage.

15. A braking system according to claim 13, wherein said second diagnosing means includes regenerative voltage monitoring means for monitoring a regenerative voltage generated by said electric motor, said second diagnosing means determining a presence of said failure of said electric motor if said regenerative voltage detected by said regenerative voltage monitoring means is lower than a predetermined reference voltage when said electric power is not supplied from said power supply portion to said electric motor.

16. A braking system according to claim 12, which is an X-crossing type braking system for a four-wheel motor vehicle including a front right, a front left, a rear right and rear left wheel, said X-crossing type braking system having two pressure application sub-systems which are connected to respective two mutually independent pressurizing chambers of said master cylinder, each of said two pressure application sub-systems including (a) a front brake cylinder passage connecting a corresponding one of said two pressurizing chambers of the master cylinder and a front wheel brake cylinder for braking a corresponding one of said front right and left wheels, (b) a rear brake cylinder passage connecting said front brake cylinder passage and a rear wheel brake cylinder for braking a corresponding one of said rear right and left wheels, (c) a first solenoid-operated shut-off valve which is disposed in a portion of said front brake cylinder passage between said master cylinder and a point of connection of said front and rear brake cylinder passages, said first solenoid-operated shut-off valve being open and closed respectively in a normal braking mode and an anti-lock braking mode of said front and rear wheel brake cylinders, (d) a normally-open second solenoid-operated shut-off valve disposed in the rear brake cylinder passage, (e) a reservoir passage connected at one of opposite ends thereof to a portion of said rear brake cylinder passage between said second solenoid-operated shut-off valve and said rear wheel brake cylinder, (f) a normally-closed third solenoid-operated shut-off valve disposed in said reservoir passage, (g) a pump passage connected at one of opposite ends thereof to said reservoir and at the other end thereof to a portion of the rear brake cylinder passage between the second solenoid-operated shut-off valve and said point of connection, said pump being disposed in said pump passage, (h) a controller for controlling said first, second and third solenoid-operated shut-off valves for controlling the fluid pressures in said front and rear wheel brake cylinders in said anti-lock braking mode, and (i) a pressure reducing valve device provided in each of said two pressure application sub-systems and disposed between said pump and said front wheel brake cylinder, for reducing the pressure of said pressurized fluid delivered from said pump and applying the reduced pressure to said front wheel brake cylinder.

17. A braking system according to claim 16, wherein said pressure reducing valve device includes a check valve for permitting a flow of the fluid in a first direction from said pump toward said front wheel brake cylinder when a pressure on one of opposite sides of said check valve nearer to said pump is higher than a pressure on the other of said opposite sides nearer to said front wheel brake cylinder by more than a predetermined amount which is not zero, said check valve inhibiting a flow of the fluid in a second direction opposite to said first direction.

\* \* \* \* \*

UNITED STATES PATENT AND TRADEMARK OFFICE
CERTIFICATE OF CORRECTION

PATENT NO. : 5,558,414   Page 1 of 2
DATED : 24 September 1996
INVENTOR(S) : Kazuhiko KUBOTA It is certified that error appears in the above-indentified patent and that said Letters Patent is hereby corrected as shown below:

On the title page, Item [57],

In the Abstract: Line 1: After "including" delete ",".
Line 5: Before "wheel" insert --the--.

| Column | Line | |
|---|---|---|
| 1 | 58 | After "respectively" insert --.--. |
| 2 | 11 | Change "inventors" to --inventor--. |
| 2 | 12 | Change "pressure-increase-by pump" to --pressure-increase-by-pump--. |
| 3 | 22 | After "vehicle" delete ",". |
| 3 | 39 | After "vehicle" delete ",". |
| 12 | 35 | Change "cylinders" to --cylinder--. |
| 15 | 20 | Change "While" to --Now that--. |
| 15 | 23 | After "rear wheel" insert --has been described,--. |

UNITED STATES PATENT AND TRADEMARK OFFICE
CERTIFICATE OF CORRECTION

PATENT NO. : 5,558,414
DATED : 24 September 1996
INVENTOR(S) : Kazuhiko KUBOTA

It is certified that error appears in the above-indentified patent and that said Letters Patent is hereby corrected as shown below:

| Column | Line | |
|---|---|---|
| 18 | 29 | Before "higher" insert --being--. |
| 19 | 25 | After "which" insert --will--. |
| 21 | 27 | After "stored" insert --in--. |
| 22 | 8 | Change "(c) and" to --and (c)--. |
| 22 | 55 | Change "S110" to --S110--. |
| 23 | 4 | Change "S10" to --S10--. |
| 27 | 63 | Change "deliver" to --delivery--. |
| 31 | 10 | Change "determines" to --determining--. |

Signed and Sealed this

Twenty-fifth Day of February, 1997

Attest:

BRUCE LEHMAN

Attesting Officer     Commissioner of Patents and Trademarks